(12) United States Patent
Nomura et al.

(10) Patent No.: US 11,900,642 B2
(45) Date of Patent: Feb. 13, 2024

(54) INSPECTION DEVICE AND METHOD FOR OPERATING INSPECTION DEVICE

(71) Applicant: SEMICONDUCTOR ENERGY LABORATORY CO., LTD., Atsugi (JP)

(72) Inventors: Masumi Nomura, Kanagawa (JP); Seiichi Yoneda, Kanagawa (JP)

(73) Assignee: Semiconductor Energy Laboratory Co., Ltd., Kanagawa-ken (JP)

(*) Notice: Subject to any disclaimer, the term of this patent is extended or adjusted under 35 U.S.C. 154(b) by 308 days.

(21) Appl. No.: 17/282,598

(22) PCT Filed: Oct. 1, 2019

(86) PCT No.: PCT/IB2019/058319
§ 371 (c)(1),
(2) Date: Apr. 2, 2021

(87) PCT Pub. No.: WO2020/075000
PCT Pub. Date: Apr. 16, 2020

(65) Prior Publication Data
US 2021/0358120 A1    Nov. 18, 2021

(30) Foreign Application Priority Data

Oct. 10, 2018 (JP) .................................. 2018-191849

(51) Int. Cl.
*G06V 10/143* (2022.01)
*G06F 18/241* (2023.01)
(Continued)

(52) U.S. Cl.
CPC .......... *G06V 10/143* (2022.01); *G06F 18/241* (2023.01); *G06T 7/0012* (2013.01);
(Continued)

(58) Field of Classification Search
CPC .. G06V 10/143; G06V 20/68; G06V 2201/06; G06F 18/241; G06T 7/0012;
(Continued)

(56) References Cited

U.S. PATENT DOCUMENTS 9,155,498 B2    10/2015   Akiyama
9,167,994 B2    10/2015   Akiyama
(Continued)

FOREIGN PATENT DOCUMENTS

CN          103003687 A      3/2013
CN          103022072 A      4/2013
(Continued)

OTHER PUBLICATIONS

Naoshi Kondo: "Automation on fruit and vegetable grading system and food traceability"; 2010; Trends in Food Science and Technology 21; pp. 145-152 (Year: 2010).*

(Continued)

*Primary Examiner* — Siamak Harandi
(74) *Attorney, Agent, or Firm* — NIXON PEABODY LLP; Jeffrey L. Costellia

(57) ABSTRACT

An inspection device having a plurality of functions is achieved. The performance of an inspection device is improved. A structure of an inspection device is simplified. A structure of an imaging device is simplified. The inspection device includes a light source having a function of emitting infrared light, a light source having a function of emitting visible light, and an imaging portion which are provided over a substrate having flexibility, and inspects a fruit or vegetable. A first image based on light including reflected light of the infrared light, and a second image and a third image based on light including reflected light of the visible light are captured by the imaging portion. The inspection device has a function of detecting one or more of (Continued)

the sugar content, the acidity, and a physiological disorder of a fruit or vegetable on the basis of the first image. The inspection device has a function of detecting at least one of the color and a scratch of a surface of the fruit or vegetable on the basis of the second image. The inspection device has a function of determining the grade of the fruit or vegetable on the basis of the first image and the second image. The inspection device has a function of detecting the size of the fruit or vegetable and determining the class on the basis of the third image.

19 Claims, 15 Drawing Sheets

(51) Int. Cl.
  *G06T 7/62* (2017.01)
  *G06T 7/00* (2017.01)
  *G06V 20/68* (2022.01)
(52) U.S. Cl.
  CPC ...... *G06T 7/62* (2017.01); *G06T 2207/10048* (2013.01); *G06T 2207/10152* (2013.01); *G06T 2207/20084* (2013.01); *G06V 20/68* (2022.01)
(58) Field of Classification Search
  CPC ............. G06T 7/62; G06T 2207/10048; G06T 2207/10152; G06T 2207/20084; G06T 2207/10024; G06T 7/0004; G06T 2207/30128; B07C 5/342; G01N 21/31; G01N 2021/3155; G01N 2021/845; G01N 2021/8592; G01N 2201/1296; G01N 21/3563
  See application file for complete search history.

(56) References Cited

U.S. PATENT DOCUMENTS

| | | | |
|---|---|---|---|
| 2011/0108836 A1 | 5/2011 | Koyama et al. | |
| 2013/0075761 A1 | 3/2013 | Akiyama | |
| 2013/0285046 A1 | 10/2013 | Yamazaki | |
| 2015/0192529 A1* | 7/2015 | Sato | G01N 21/88 356/73 |
| 2016/0187199 A1* | 6/2016 | Brunk | G01J 3/0208 348/89 |
| 2018/0011008 A1 | 1/2018 | Ogawa et al. | |
| 2018/0129852 A1 | 5/2018 | Zeng. et al. | |

FOREIGN PATENT DOCUMENTS

| | | |
|---|---|---|
| CN | 106981503 A | 7/2017 |
| CN | 207097825 U | 3/2018 |
| DE | 102017125292 | 10/2018 |
| JP | 2004-020470 A | 1/2004 |
| JP | 2004-132773 A | 4/2004 |
| JP | 2006-003134 A | 1/2006 |
| JP | 2006-170669 A | 6/2006 |
| JP | 2006-191816 A | 7/2006 |
| JP | 2007-081203 A | 3/2007 |
| JP | 2011-119711 A | 6/2011 |
| JP | 2013-073965 A | 4/2013 |
| JP | 2013-243355 A | 12/2013 |
| JP | 6203923 | 9/2017 |
| JP | 2018-004646 A | 1/2018 |
| KR | 2013-0033278 A | 4/2013 |
| KR | 2013-0139747 A | 12/2013 |
| WO | WO-2012/098682 | 7/2012 |

OTHER PUBLICATIONS

Pla, F. Sanchiz and J.M., Sa'nchez, J.S.: "An Integral Automation of Industrial Fruit and Vegetable Sorting by Machine Vision"; 2001 ; IEEE; pp. 541-546. (Year: 2001).*
J.D.T. Tannock: "Automating Quality Systems—A guide to the design and implementation of automated quality systems in manufacturing"; 1992; ISBN 978-94-010-5044-9 ISBN 978-94-011-2366-2 (eBook). (Year: 1992).*
Baohua Zhang, Dejian Dai, Jichao Huang, Jun Zhou, Qifa Gui & Fang Dai: "Influence of physical and biological variability and solution methods in fruit and vegetable quality nondestructive inspection . . . : A review"; Jul. 5, 2017; Critical Reviews in Food Science and Nutrition; pp. 2099-2118. (Year: 2017).*
International Search Report (Application No. PCT/IB2019/058319) dated Dec. 24, 2019.
Written Opinion (Application No. PCT/IB2019/058319) dated Dec. 24, 2019.

* cited by examiner

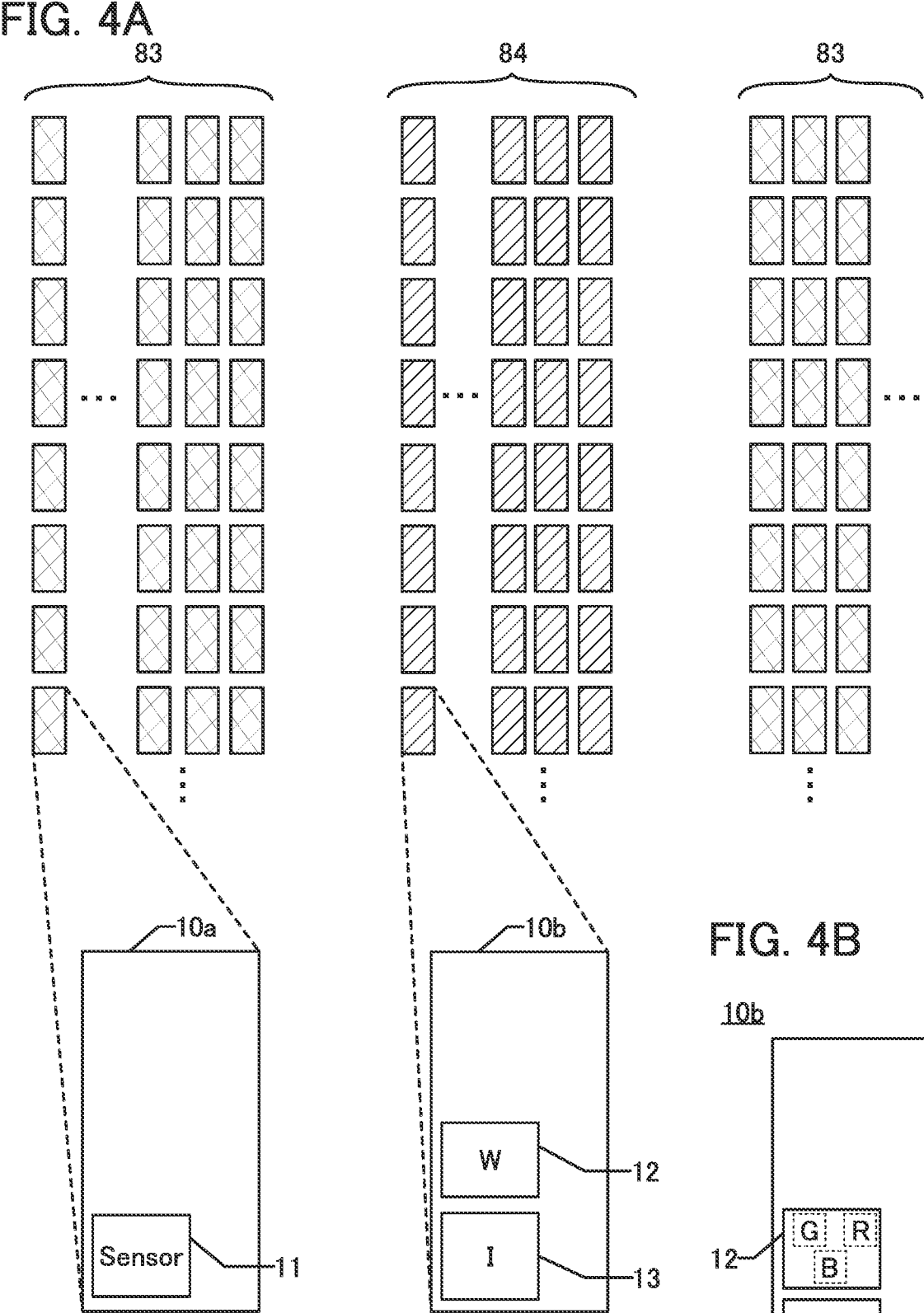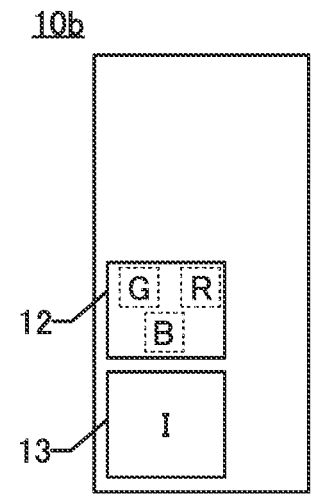

| Line[1] | Rn-1 | En | | Rn | En+1 | |
| Line[2] | En-1 | Rn-1 | En | Rn | En+1 | |
| Line[3] | En-1 | Rn-1 | En | Rn | | En+1 |
| ⋮ | | | | | | |
| Line[M] | En-1 | | Rn-1 | En | | Rn |

| Line[1] | En | Rn | | | En+1 |
| Line[2] | En | | Rn | | En+1 |
| Line[3] | En | | Rn | | En+1 |
| ⋮ | | | | | |
| Line[M] | En | | | Rn | En+1 |

INSPECTION DEVICE AND METHOD FOR OPERATING INSPECTION DEVICE

TECHNICAL FIELD

One embodiment of the present invention relates to an inspection device. One embodiment of the present invention relates to a method for operating an inspection device Note that one embodiment of the present invention is not limited to the above technical field. Examples of the technical field of one embodiment of the present invention disclosed in this specification and the like include a semiconductor device, an imaging device, a display device, a light-emitting device, a power storage device, a memory device, an electronic device, a lighting device, an input device, an input/output device, an operation method thereof, and a manufacturing method thereof. A semiconductor device generally means a device that can function by utilizing semiconductor characteristics.

BACKGROUND ART

It is important for a fanner to determine the degree of maturity of an obtained harvest, for example, in order to know the value of the harvest. Patent Document 1 discloses an example of determining the degree of harvest maturity. An imaging device is used for determination of a harvest in some cases.

Imaging devices have been applied not only to a use of taking a picture and a moving image but also to a variety of uses of biological authentication such as face authentication and fingerprint authentication, and an input device such as a touch sensor and a motion sensor. In addition, improvement in performance and function of an imaging device has progressed. For example, Patent Document 2 discloses an imaging device that uses a transistor including an oxide semiconductor and having an extremely low off-state current in part of a pixel circuit and that uses a transistor including silicon and being capable of forming a CMOS (Complementary Metal Oxide Semiconductor) circuit in a peripheral circuit.

Patent Document 3 discloses an imaging device having a structure in which a transistor including silicon, a transistor including an oxide semiconductor, and a photodiode including a crystalline silicon layer are stacked.

REFERENCE

[Patent Document]
[Patent Document 1] Japanese Published Patent Application No. 2018-4646
[Patent Document 2] Japanese Published Patent Application No. 2011-119711
[Patent Document 3] Japanese Published Patent Application No. 2013-243355

SUMMARY OF THE INVENTION

Problems to be Solved by the Invention

An object of one embodiment of the present invention is to achieve an inspection device having a plurality of functions. Another object of one embodiment of the present invention is to improve the performance of an inspection device. Another object of one embodiment of the present invention is to simplify a structure of an inspection device. Another object of one embodiment of the present invention is to simplify a structure of an imaging device.

Note that the description of these objects does not preclude the existence of other objects. One embodiment of the present invention does not have to achieve all these objects. Note that objects other than these can be derived from the description of the specification, the drawings, the claims, and the like.

Means for Solving the Problems

One embodiment of the present invention is an inspection device including a first light source, a second light source, and an imaging portion provided over a substrate having flexibility, in which the first light source has a function of emitting infrared light, the second light source has a function of emitting visible light, a fruit or vegetable is irradiated with the infrared light emitted from the first light source and the visible light emitted from the second light source, reflected light of the infrared light with which the fruit or vegetable is irradiated and reflected light of the visible light with which the fruit or vegetable is irradiated enter the imaging portion, a first image to a third image are captured by the imaging portion, the first image is an image based on light including the reflected light of the infrared light, the second image and the third image are images based on light including the reflected light of the visible light, the inspection device has a function of detecting one or more of the sugar content, the acidity, and a physiological disorder of the fruit or vegetable on the basis of the first image, the inspection device has a function of detecting one or more of the color and a scratch of a surface of the fruit or vegetable on the basis of the second image, the inspection device has a function of determining the grade of the fruit or vegetable on the basis of the first image and the second image, and the inspection device has a function of detecting the size of the fruit or vegetable and determining the class on the basis of the third image.

Another embodiment of the present invention is an inspection device including a pixel array provided over a substrate having flexibility, in which the pixel array includes a plurality of pixels, each of the pixels includes a first light-emitting element, a second light-emitting element, and a photoelectric conversion element, the first light-emitting element has a function of emitting infrared light, the second light-emitting element has a function of emitting visible light, a fruit or vegetable is irradiated with the infrared light emitted from the first light-emitting element and the visible light emitted from the second light-emitting element, reflected light of the infrared light with which the fruit or vegetable is irradiated and reflected light of the visible light with which the fruit or vegetable is irradiated enter the photoelectric conversion element, a first image to a third image are captured by the photoelectric conversion element, the first image is an image based on light including the reflected light of the infrared light, the second image and the third image are images based on light including the reflected light of the visible light, the inspection device has a function of detecting one or more of the sugar content, the acidity, and a physiological disorder of the fruit or vegetable on the basis of the first image, the inspection device has a function of detecting one or more of the color and a scratch of a surface of the fruit or vegetable on the basis of the second image, the inspection device has a function of determining the grade of the fruit or vegetable on the basis of the first image and the second image, and the inspection device has a function of detecting the size of the fruit or vegetable and determining the class on the basis of the third image.

In the above structure, each of the first light-emitting element and the second light-emitting element is preferably an organic EL element.

In the above structure, the substrate preferably has a shape along a side surface of a cylinder.

In the above structure, the diameter of the cylinder is preferably variable.

Another embodiment of the present invention is a method for operating an inspection device that includes a pixel array provided over a substrate having flexibility, in which the pixel array includes a plurality of pixels, and each of the plurality of pixels includes a first light-emitting element, a second light-emitting element, and a photoelectric conversion element. The method includes a first step of performing irradiation with infrared light from the first light-emitting element on a fruit or vegetable; a second step of reflecting, on a surface of the fruit or vegetable and the vicinity thereof, the infrared light with which the fruit or vegetable is irradiated in the first step and capturing a first image by the photoelectric conversion element; a third step of detecting one or more of the sugar content, the acidity, and a physiological disorder of the fruit or vegetable on the basis of the first image captured in the second step; a fourth step of performing irradiation with visible light from the second light-emitting element on the fruit or vegetable; a fifth step of reflecting, on the surface of the fruit or vegetable and the vicinity thereof, the visible light with which the fruit or vegetable is irradiated in the fourth step and capturing a second image and a third image by the photoelectric conversion element; a sixth step of detecting one or more of the color and a scratch of the surface on the basis of the second image; a seventh step of combining a detection result in the third step and a detection result in the sixth step and determining the grade of the fruit or vegetable; and an eighth step of detecting the size of the fruit or vegetable and performing classification on the basis of the third image.

In the above structure, each of the first light-emitting element and the second light-emitting element is preferably an organic EL element.

In the above structure, the substrate preferably has a shape along a side surface of a cylinder.

In the above structure, the diameter of the cylinder is preferably variable.

Effect of the Invention

According to one embodiment of the present invention, an inspection device having a plurality of functions can be achieved. According to one embodiment of the present invention, the performance of an inspection device can be improved. According to one embodiment of the present invention, the structure of an inspection device can be simplified. According to one embodiment of the present invention, the structure of an imaging device can be simplified.

Note that the description of the effects does not preclude the existence of other effects. Note that one embodiment of the present invention does not need to have all these effects, Note that effects other than these can be derived from the description of the specification, the drawings, the claims, and the like.

BRIEF DESCRIPTION OF THE DRAWINGS

FIG. 4A and FIG. 4B are diagrams illustrating examples of a pixel array.

MODE FOR CARRYING OUT THE INVENTION

Figure 1A:
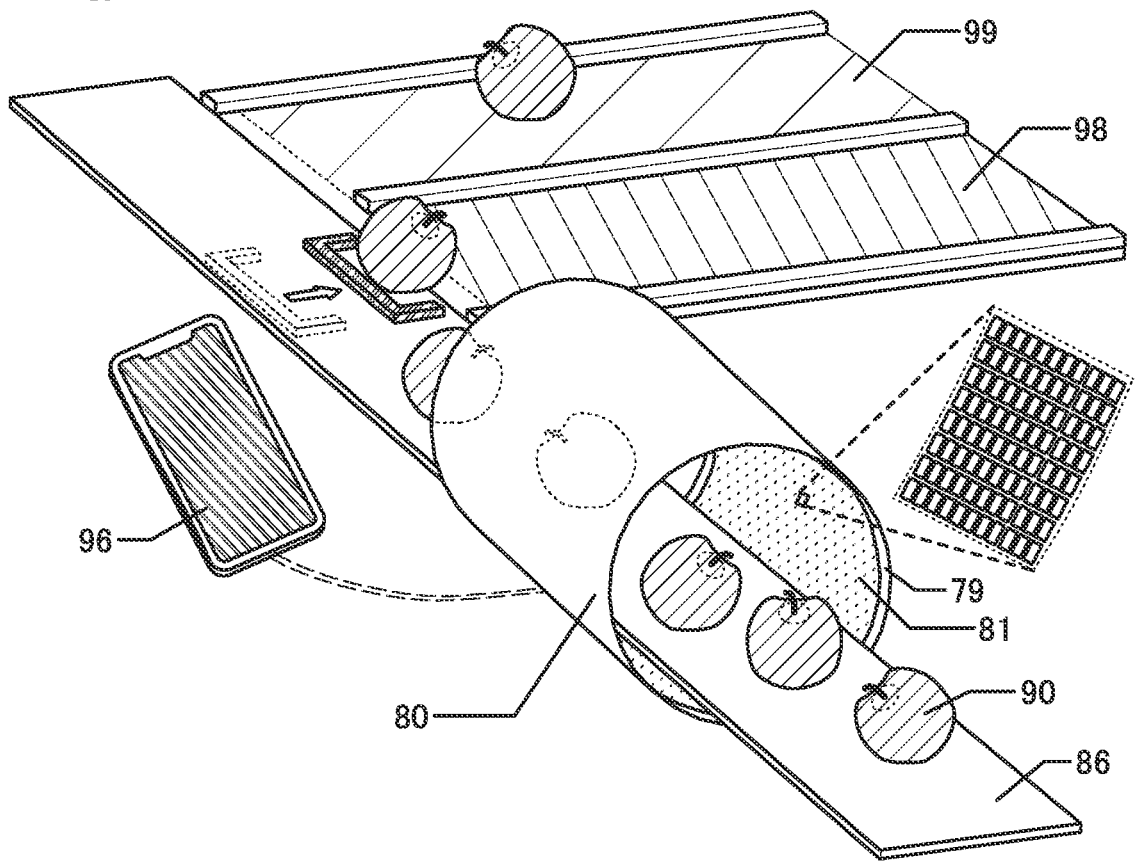
FIG. 1A and FIG. 1B are diagrams illustrating an example of a structure of an inspection device.

Hereinafter, embodiments will be described with reference to the drawings. Note that the embodiments can be implemented with many different modes, and it will be readily understood by those skilled in the art that modes and details thereof can be changed in various ways without departing from the spirit and scope thereof. Thus, the present invention should not be construed as being limited to the following description of the embodiments.

Note that in structures of the present invention described below, the same portions or portions having similar functions are denoted by the same reference numerals in different drawings, and a description thereof is not repeated. Furthermore, the same hatch pattern is used for the portions having similar functions, and the portions are not especially denoted by reference numerals in some cases.

Note that in each drawing described in this specification, the size, the layer thickness, or the region of each component is exaggerated for clarity in some cases. Therefore, they are not limited to the illustrated scale.

Note that in this specification and the like, the ordinal numbers such as "first" and "second" are used in order to avoid confusion among components and do not limit the number.

Embodiment 1

In this embodiment, an inspection device of one embodiment of the present invention is described with reference to drawings.

The inspection device of one embodiment of the present invention has a function of inspecting a fruit or vegetable.

FIG. 1A illustrates an inspection device 80 of one embodiment of the present invention. The inspection device 80 has a function of performing imaging. Furthermore, the inspection device 80 has a function of emitting light. The inspection device 80 preferably has a function of emitting visible light and infrared light. Visible light used in one embodiment of the present invention is preferably light having a wavelength of greater than or equal to 380 nm and less than 700 nm, for example. Infrared light used in one embodiment of the present invention preferably has a wavelength of greater than or equal to 700 nm and less than or equal to 2500 nm.

The inspection device 80 includes a substrate 79 and a pixel array 81. The pixel array 81 is provided over the substrate 79. The pixel array 81 includes a plurality of pixels. Each of the pixels included in the pixel array 81 includes at least one of a photoelectric conversion element and a light-emitting element.

The substrate 79 preferably has flexibility. When the substrate 79 has flexibility, a single component including the substrate 79 and the pixel array 81 can have a desired shape easily. For example, the single component can have a cylindrical shape as illustrated in FIG. 1A.

Figure 1B:
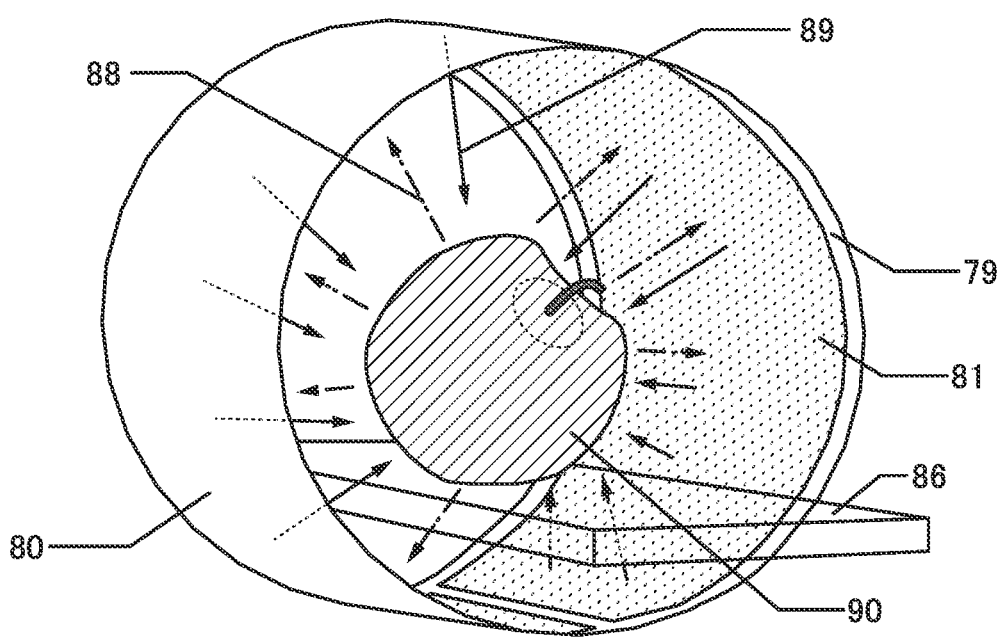

When the single component including the substrate 79 and the pixel array 81 has a cylindrical shape, for example, variation in distance from a surface of the pixel array 81 to a surface of a fruit or vegetable 90 can be made small, as illustrated in FIG. 1B. Accordingly, variation in intensity of irradiation with light 89 from the surface of the pixel array 81 on the surface of the fruit or vegetable 90 can be made small. By making variation in intensity of irradiation small, a scratch and the like are detected easily, leading to an improvement in inspection accuracy. Furthermore, the fruit or vegetable 90 is placed so that the periphery of the fruit or vegetable 90 is surrounded by a light-emitting surface; thus the fruit or vegetable 90 can be placed on a conveyor belt without aligning the directions of the fruits or vegetables 90, and a burden to a worker can be reduced, so that the operating efficiency can be increased. Moreover, light irradiation can be performed from a given angle such as an oblique direction, in addition to four directions of left, right, top, and bottom. Accordingly, a shadow is less likely to be produced in some cases as compared to a shape such as a prism shape to be described later, for example, and in that case, the inspection accuracy is improved.

The single component including the substrate 79 and the pixel array 81 preferably has a function of being moved up and down in accordance with the kind of the fruit or vegetable 90. For example, in the case where a smaller fruit or vegetable such as an orange or an apple is inspected, the cylinder is moved down more and a light source can be closer than in the case where a bigger fruit or vegetable such as a melon or a watermelon is inspected. When the light source is closer, the intensity of the light with which the fruit or vegetable 90 is irradiated can be increased in some cases. When the intensity is increased, the inspection accuracy is improved in some cases. As described above, the inspection device 80 can inspect a plurality of kinds of fruits or vegetables.

In the case where the single component including the substrate 79 and the pixel array 81 has a cylindrical shape, the diameter of the cross-sectional area of the cylinder may be variable. When the substrate 79 having flexibility is used, the diameter of the cross-section area of the cylinder can be easily variable. With such a structure, the light source can be closer to a smaller fruit or vegetable in accordance with size.

Although FIG. 1 illustrates an example in which the single component including the substrate 79 and the pixel array 81 has a cylindrical shape, the single component including the substrate 79 and the pixel array 81 can have a variety of shapes such as an elliptic cylindrical shape, a semi-cylindrical shape, and a prism shape, for example.

As illustrated in FIG. 1A, a plurality of fruits or vegetables 90 are placed on a conveyor belt 86 and introduced into the inspection device 80.

In the inspection device 80, the fruits or vegetables 90 are irradiated with the light emitted from the pixel array 81. The light emitted to the fruit or vegetable is reflected on the surface of the fruit or vegetable 90 and in the vicinity thereof and partly enters the pixel array 81. The light entering the pixel array 81 is captured by the pixel array 81.

With the use of data obtained by imaging performed by the pixel array 81, the inspection device 80 inspects the fruit or vegetable 90. As the kinds of inspection, evaluation of the size, the shape, the color, a scratch, a physiological disorder, the sugar content, the acidity, the degree of maturity, and the like, of the fruit or vegetable 90 can be given. As evaluation of a physiological disorder, detection of a void in the fruit or vegetable 90, or the like can be given.

For evaluation of the size, the shape, the color, and a scratch of the fruit or vegetable 90, for example, the fruit or vegetable 90 is irradiated with visible light, imaging is performed, and an obtained image is analyzed.

For evaluation of the sugar content, the acidity, and a physiological disorder of the fruit or vegetable 90, for example, the fruit or vegetable 90 is irradiated with infrared light, and imaging is performed. Here, for example, separation of light reflected from the fruit or vegetable 90 may be performed in the imaging.

The intensity of reflected light of infrared light changes depending on the sugar content of the fruit or vegetable 90. In contrast, the intensity of reflected light of infrared light changes also depending on an aspect other than the sugar content of the fruit or vegetable 90. For example, the intensity changes depending on the distance between the fruit or vegetable 90 and the pixel array 81, the planarity of the surface of the fruit or vegetable 90, the direction of the surface of the fruit or vegetable 90, or the like. In the case of measuring infrared light, the intensity can be determined using visible light as a reference.

The inspection device of one embodiment of the present invention has a function of emitting visible light and infrared light. The inspection device of one embodiment of the present invention can perform inspection using visible light and inspection using infrared light in the same device; therefore, a cost required for inspection can be reduced in some cases as compared to the case where an inspection device using visible light and an inspection device using infrared light are prepared separately.

The inspection device 80 includes a control circuit. The control circuit included in the inspection device has a function of controlling imaging and irradiation with light by the pixel array 81. The control circuit included in the inspection device has a function of obtaining an inspection result of the fruit or vegetable 90 on the basis of the data obtained by imaging.

In the inspection of the fruit or vegetable 90, analysis such as image analysis is performed in some cases. The analysis such as image analysis may be performed using the control circuit included in the inspection device 80 or may be performed using a terminal connected to the inspection device 80, or the like. In the example illustrated FIG. 1A, a portable terminal 96 is connected to the inspection device 80 and image analysis is performed, An integrated circuit mounted on the portable terminal 96 preferably has a function of performing image analysis using machine learning. The portable terminal 96 includes a display portion. A user of the inspection device 80 can perform input of an item required for inspection, for example, using an image displayed on the display portion of the portable terminal 96. The portable terminal 96 and the inspection device 80 may be connected to each other with or without wire.

The fruits or vegetables 90 are grouped on the basis of the inspection result by the inspection device 80. As illustrated in FIG. 1, for example, the fruits or vegetables 90 are transferred to divided areas on the basis of groups to which the fruits or vegetables 90 belong. In the example illustrated in FIG. 1A, the fruit or vegetable 90 belonging to a first group and the fruit or vegetable 90 belonging to a second group are transferred to an area 98 and an area 99, respectively.

The conveyor belt 86 can be formed using a material that transmits visible light. Thus, visible light can be transmitted through the conveyor belt 86, and a bottom portion of the fruit or vegetable 90 can be irradiated with visible light. When the bottom portion of the fruit or vegetable 90 is irradiated with visible light, for example, a scratch on the bottom portion can be detected.

The conveyor belt 86 may be formed using a material that transmits infrared light. The conveyor belt 86 may have a net-like shape. When the conveyor belt 86 has a net-like shape, visible light and infrared light are transmitted through a space between meshes, and the bottom portion of the fruit or vegetable 90 is irradiated with visible light and infrared light.

Next, the pixel array included in the inspection device 80 is described with reference to FIG. 2. The inspection device 80 illustrated in FIG. 2A includes the pixel array 81. The inspection device 80 in FIG. 29 includes a pixel array 83 and a pixel array 84, and each of the pixel array 83 and the pixel array 84 has a belt-like shape. In the inspection device 80 in FIG. 29, the belt-like pixel arrays 83 and the belt-like pixel arrays 84 are alternately arranged.

Figure 3A:
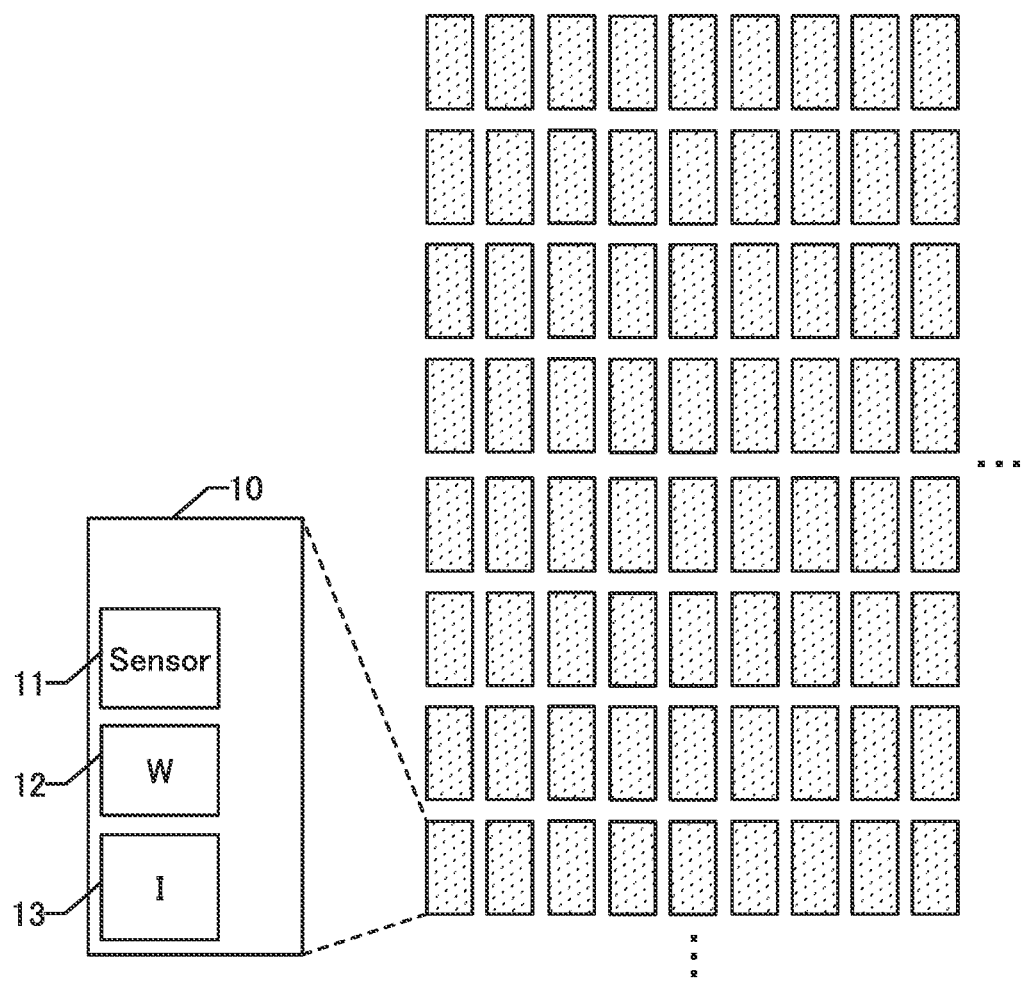
FIG. 3A and FIG. 3B are diagrams illustrating examples of a pixel array.

FIG. 3A illustrates an example of the pixel array 81 and a pixel 10 included in the pixel array 81, The pixel array 81 illustrated in FIG. 3A includes a plurality of pixels 10 arranged in a matrix. Each of the pixels 10 includes a photoelectric conversion element 11, a light-emitting element 12, and a light-emitting element 13. The light-emitting element 12 has a function of emitting white light as visible light, for example. The light-emitting element 13 has a function of emitting infrared light, for example.

Figure 3B:
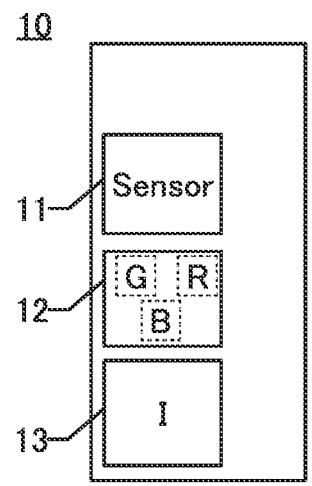

As the pixel 10 included in the pixel array 81, the pixel 10 illustrated in FIG. 3B may be used. The pixel 10 illustrated in FIG. 3B includes the photoelectric conversion element 11, the light-emitting element 12, and the light-emitting element 13. The light-emitting element 12 illustrated in FIG. 3B has a function of emitting red light, green light, and blue light as visible light, for example. The light-emitting element 13 has a function of emitting infrared light, for example.

FIG. 4A illustrates a state where the belt-like pixel arrays 83 and the belt-like pixel arrays 84 are alternately arranged. The pixel array 83 includes a plurality of pixels 10a arranged in a matrix. The pixel 10a includes the photoelectric conversion element 11. The pixel array 84 includes a plurality of pixels 10b arranged in a matrix. The pixel 10b includes the light-emitting element 12 and the light-emitting element 13, the light-emitting element 12 has a function of emitting white light as visible light, and the light-emitting element 13 has a function of emitting infrared light.

As the pixel 10b included in the pixel array 84, the pixel 10b illustrated in FIG. 4B may be used. The pixel 10b illustrated in FIG. 4B includes the light-emitting element 12 and the light-emitting element 13, the light-emitting element 12 has a function of emitting red light, green light, and blue light as visible light, and the light-emitting element 13 has a function of emitting infrared light.

Figure 2A:
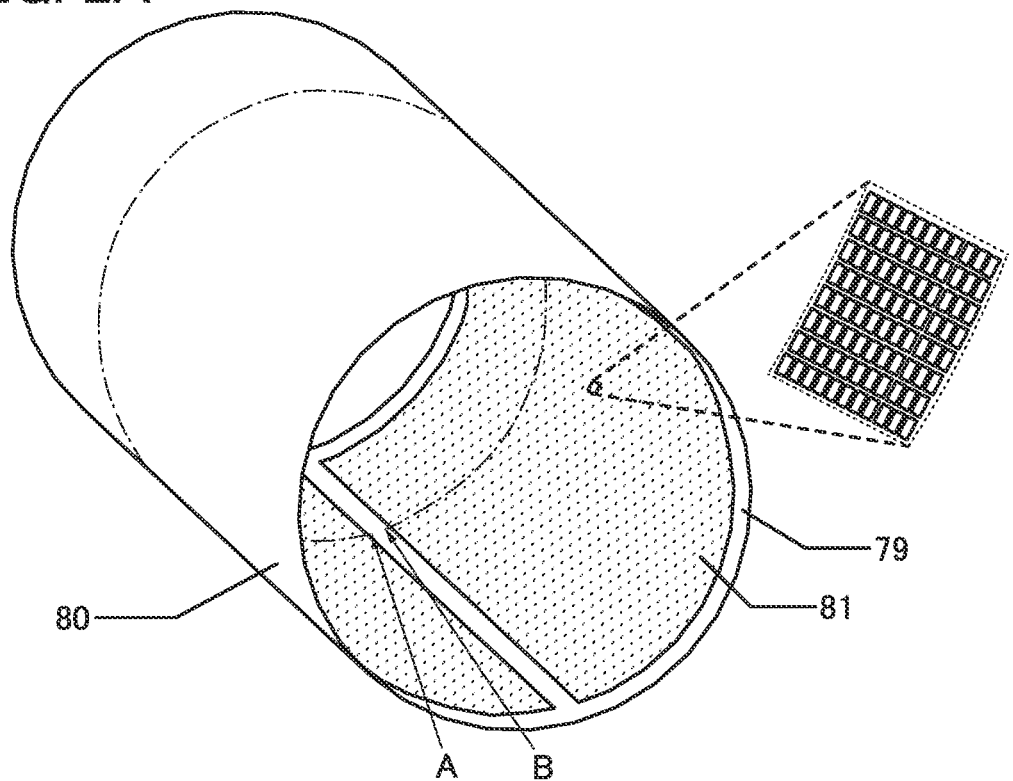
FIG. 2A and FIG. 2B are diagrams illustrating examples of a structure of an inspection device.
Figure 2B:
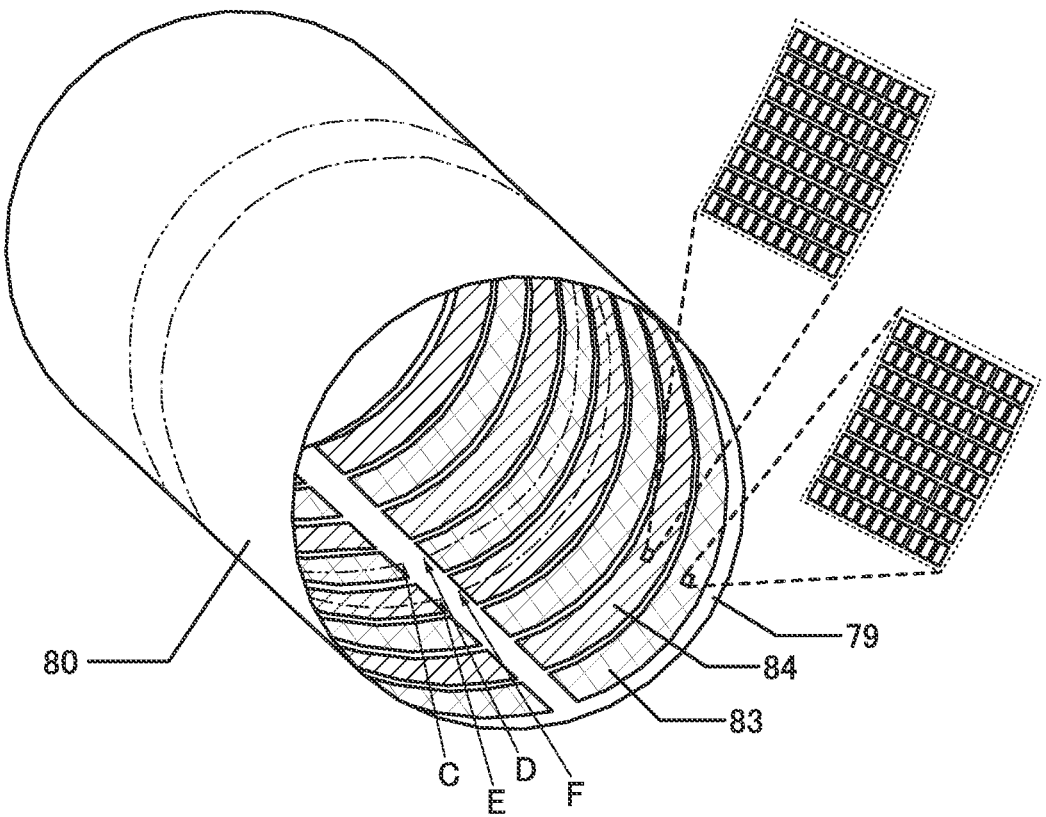

When the belt-like pixel arrays 83 and the belt-like pixel arrays 84 are alternately arranged as in the inspection device 80 illustrated in FIG. 2B, a region where imaging is performed, here, the pixel array 83, and a light-emitting region, here, the pixel array 84 can be separated. When the imaging region and the light-emitting region are separated, for example, different lenses and the like can be used for the regions.

A light source such as an LED or a halogen lamp may be used instead of the pixel array 84.

Figure 5A:
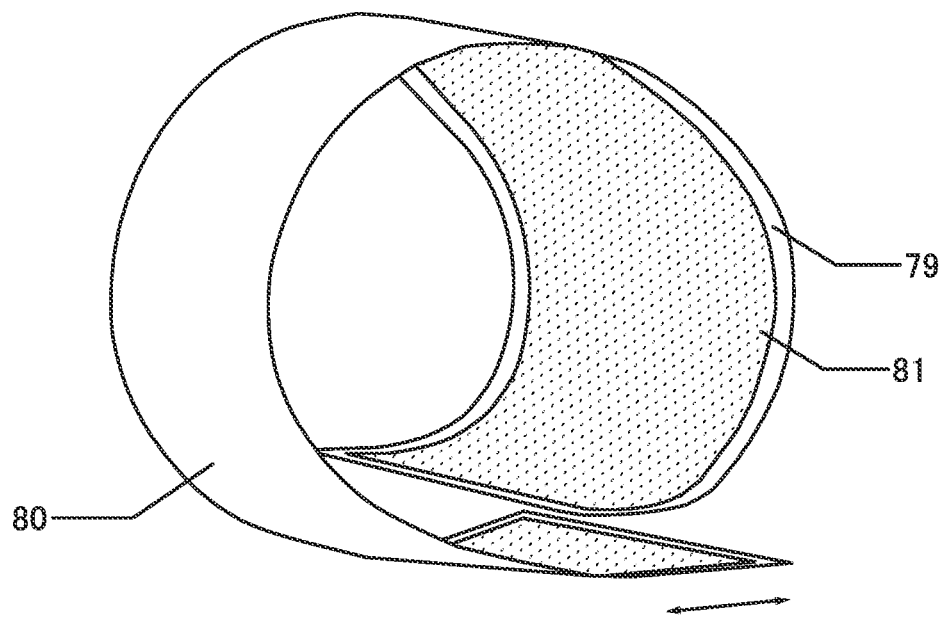
FIG. 5A is a diagram illustrating an example of operation of an inspection device.
Figure 5B:
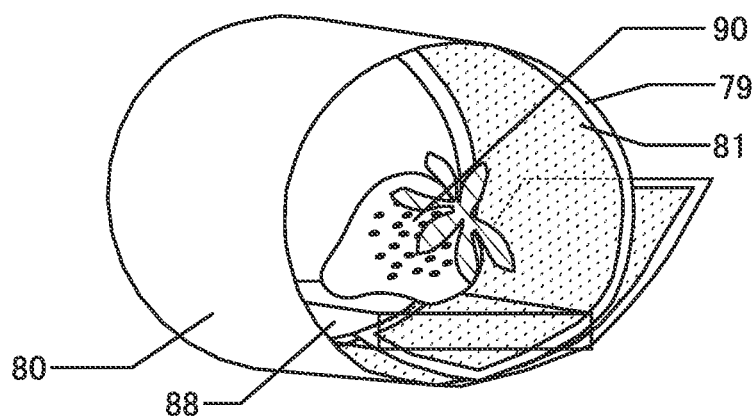
FIG. 5B is a diagram illustrating an example of a structure of the inspection device.

As illustrated in FIG. 5A, in the inspection device 80, the radius of the substrate 79 having a shape along a side surface of the cylinder can be changed in accordance with the size of the fruit or vegetable 90. For example, in the case where the fruit or vegetable 90 is a strawberry as illustrated in FIG. 5B, the radius is made smaller than in the case where the fruit or vegetable 90 is an apple as illustrated in FIG. 1B. When the radius is made smaller, the distance between the fruit or vegetable 90 and the pixel array 81 becomes smaller, and thus the intensity of light with which the fruit or vegetable 90 is irradiated can be increased. Furthermore, light reflected from the surface of the fruit or vegetable 90 and the vicinity thereof can be detected more easily. As described above, the substrate 79 having flexibility is used in the inspection device 80, whereby a plurality of kinds of fruits or vegetables having a large difference in size, color, shape, and the like can also be inspected using the single device, Although FIG. 1A and FIG. 5B illustrate an example of an apple and an example of a strawberry; respectively, as the fruit or vegetable, a variety of kinds of fruits or vegetables, e.g., fruits such as a citrus, a melon, a watermelon, a mango, a banana, and a mangosteen; and vegetables such as a potato, a tomato, and an eggplant can be inspected.

Figure 6:
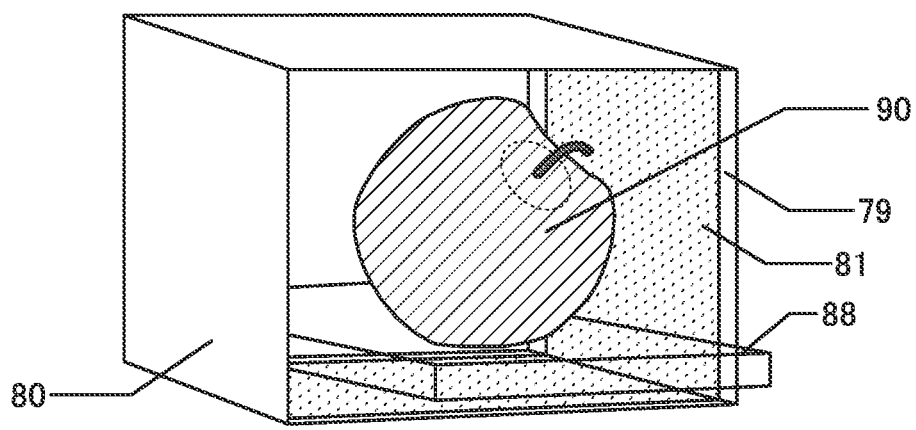
FIG. 6 is a diagram illustrating an example of a structure of an inspection device.

As illustrated in FIG. 6, the substrate 79 and the pixel array 81 included in the inspection device 80 can have a shape along a side surface of a quadrangular prism.

Figure 7A:
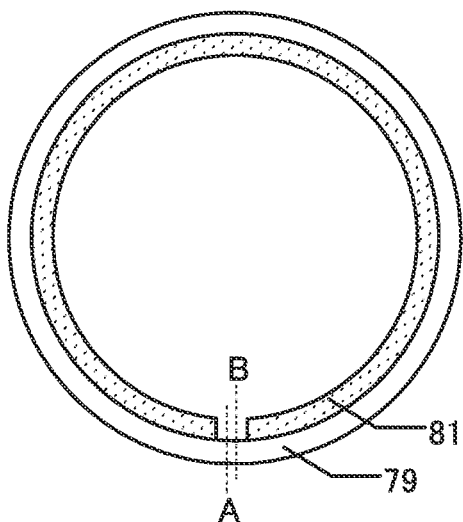
FIG. 7A is a cross-sectional view illustrating part of an inspection device.
Figure 7B:
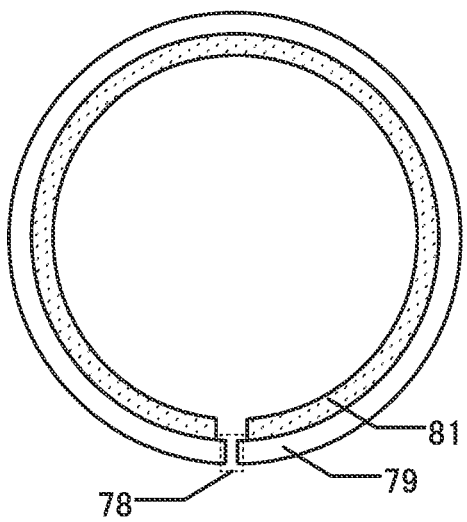
FIG. 7B is a cross-sectional view illustrating part of the inspection device.
Figure 7C:
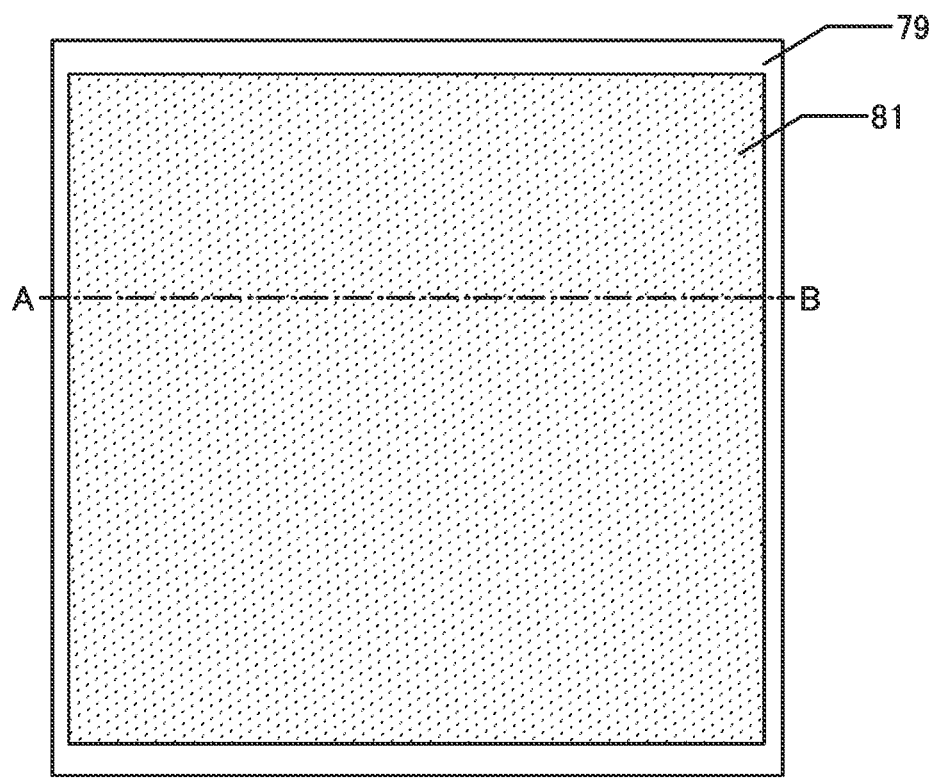
FIG. 7C is a top view illustrating the inspection device that is partly developed.

FIG. 7A illustrates a cross section taken along dashed-dotted line A-B in the inspection device 80 in FIG. 2A. As illustrated in FIG. 7A, a cross section of the substrate 79 has a shape along a circle, and the pixel array 81 is provided on a surface of the inside of the circle. In FIG. 7A and the like, the thickness of the pixel array or the like is exaggerated for easy viewing in some cases. Although FIG. 7A illustrates an example in which the cross section of the substrate 79 has a shape of a circle and is continuously connected, part of the cross section may include a cut 78 or the like as illustrated in FIG. 7B, for example. FIG. 7C illustrates a diagram when seen from the above in which the substrate 79 having a cylindrical shape and the pixel array 81 over the substrate 79 are developed on a plane.

Figure 8A:
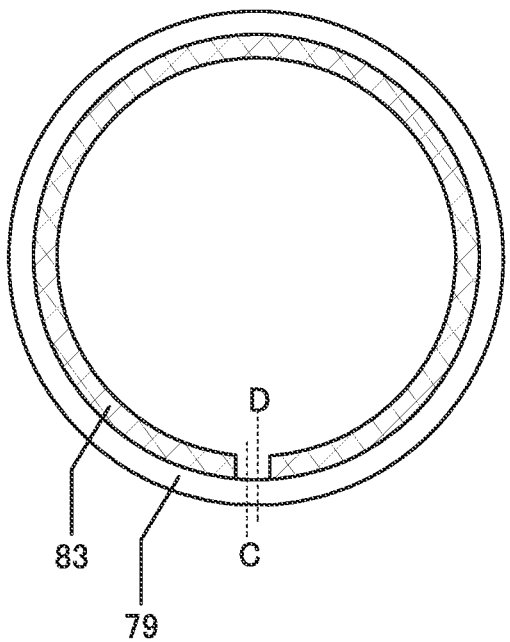
FIG. 8A is a cross-sectional view illustrating part of an inspection device.
Figure 8B:
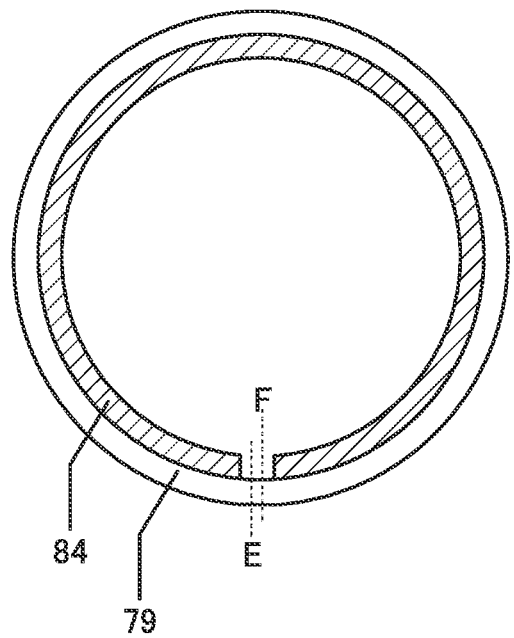
FIG. 8B is a cross-sectional view illustrating part of the inspection device.
Figure 8C:
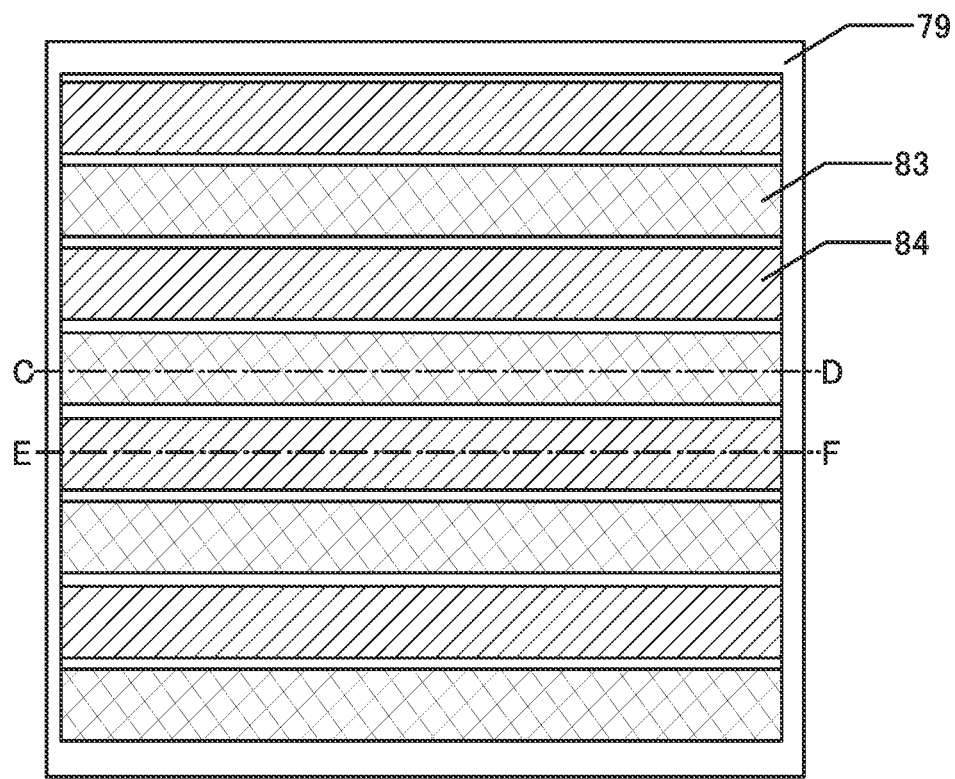
FIG. 8C is a top view illustrating the inspection device that is partly developed.

FIG. 8A and FIG. 8B illustrate a cross section taken along dashed-double dotted line C-D and a cross section taken along dashed dotted line E-F in the inspection device 80 in FIG. 2B. FIG. 8C illustrates a diagram when seen from the above in which the substrate 79 having a cylindrical shape, the pixel array 83 over the substrate 79, and the pixel array 84 over the substrate 79 are developed on a plane.

Although the cross section of the substrate 79 has a shape along a circle in FIG. 7A, FIG. 8A, and the like, it may have shapes along a variety of curves such as an elliptical shape, in addition to a circle. In the case where it has a shape along a polygonal, for example, a polygonal having five or more corners (alternatively also referred to as vertexes) is preferable. As the number of corners of the polygonal is larger, the angle of the corner becomes wider, and light from the light-emitting element is less likely to be blocked; thus, a shadow can be less likely to be produced. In addition, the corner is preferably rounded. When the corner is rounded, a shadow can be less likely to be produced.

Next, an inspection device using the above pixel array is described below.

The inspection device of one embodiment of the present invention includes a light-emitting element. Light emitted from the light-emitting element and reflected from an object is received by a photoelectric conversion element included in a pixel. As the light-emitting element, an EL element can be used, for example. The use of an EL element enables manufacture of an imaging device with a thin light source.

Moreover, an element that emits infrared light is used as the light-emitting element, whereby it is possible to use the inspection device for an application such as inspection of an organic substance, in particular, a fruit or vegetable. In addition, a pixel capable of performing imaging with a global shutter system is used, whereby an image without distortion can be obtained even when an object is not stopped moving. A pixel capable of performing imaging with a global shutter system is used, whereby imaging can also be performed at high speed.

Light entering the photoelectric conversion element may be separated by a color filter. Light which has been subjected to separation may enter the photoelectric conversion element. The imaging device of one embodiment of the present invention may include a diffraction grating for separation of light, for example. Light separated according to wavelength by the diffraction grating enters the photoelectric conversion element in a corresponding region. Different pixels can be assigned to the respective regions corresponding to wavelengths. For example, in light separated by the diffraction grating, light having a first wavelength and a wavelength in the vicinity thereof enters a first pixel, light having a second wavelength and a wavelength in the vicinity thereof enters a second pixel, and light having a third wavelength and a wavelength in the vicinity thereof enters a third pixel. When the intensity of light entering the photoelectric conversion element in a region corresponding to a wavelength is calculated, the wavelength of reflected light can be calculated.

The inspection device of one embodiment of the present invention can include the pixel array over the substrate having flexibility and the light source included in the pixel array can be formed using an organic EL element or the like; thus, the inspection device can be lightweight.

Figure 9:
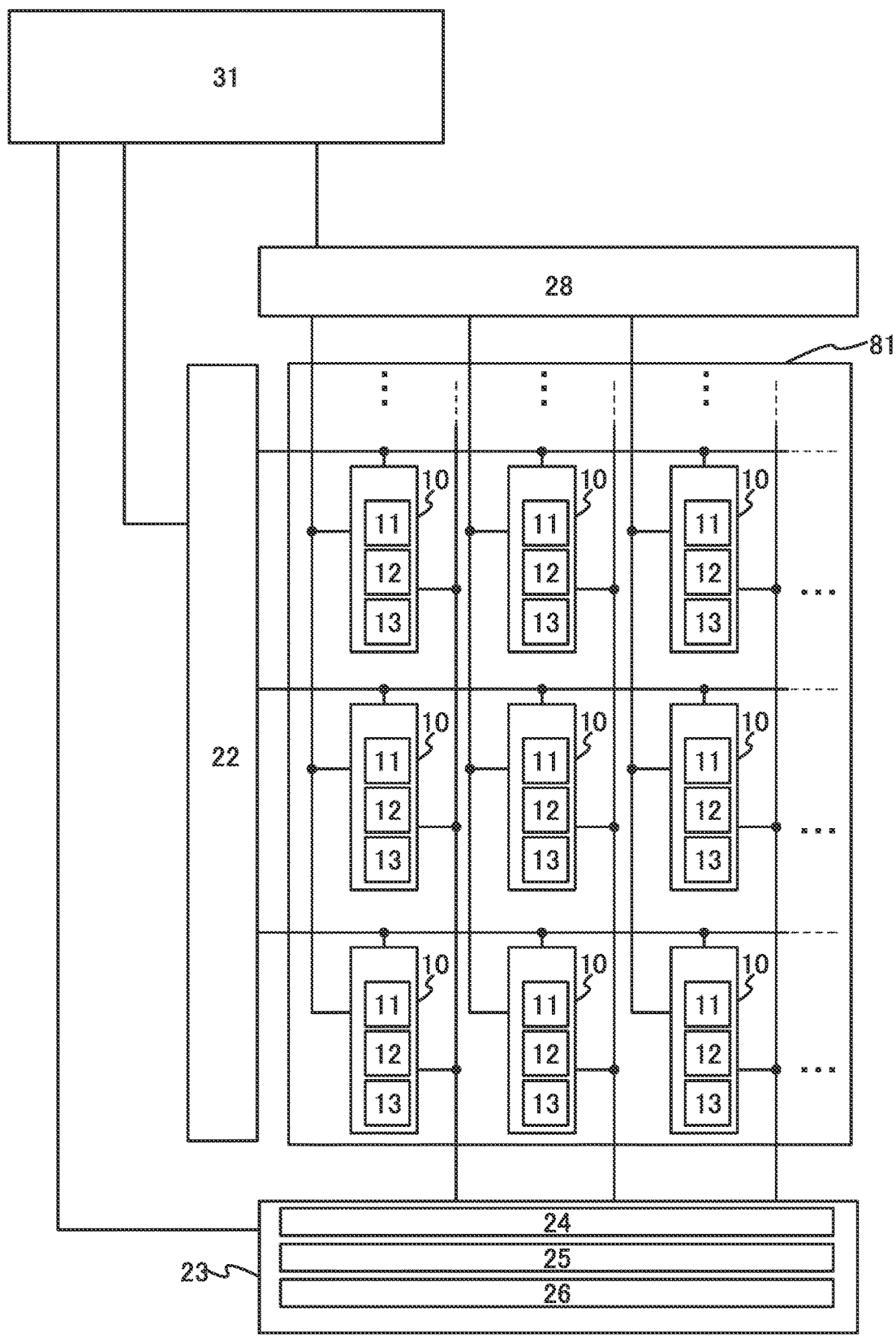
FIG. 9 is a diagram illustrating an example of a structure of an inspection device.

FIG. 9 is a block diagram illustrating the inspection device of one embodiment of the present invention. The inspection device includes the pixel array 81 including the pixels 10 arranged in a matrix, a circuit 22 having a function of selecting a row of the pixel array 81 (row driver), a circuit 23 having a function of reading out data from the pixels 10, and a circuit 28 for supplying a power supply potential. The pixel 10 includes the photoelectric conversion element 11, the light-emitting element 12, and the light-emitting element 13. The inspection device 80 can also have a structure including only part of the control circuit 31. It is preferable that the control circuit 31 be electrically connected to the circuit 22, the circuit 23, and the circuit 28, as illustrated in FIG. 9. Alternatively, the above portable terminal 96 can have some of functions of the control circuit 31.

The control circuit 31 may have a function of performing an arithmetic operation in a neural network. An AI (Artificial Intelligence) device can be used for determination of a grade and determination of a class by the inspection device 80. For example, image processing with high accuracy can be performed using the AI device. For example, the AI device performs an arithmetic operation using a neural network. Furthermore, the AI device can predict a change in a variety of parameters such as the sugar content after certain time passed, by learning using an inspection result of the inspection device, for example. For example, even in the case where the sugar content is lower than that in a preferable range in inspection, a fruit or vegetable can be shipped on the basis of the prediction that the sugar content will be improved to the preferable range when the fruit or vegetable is in stores or when a consumer eats the fruit or vegetable. The AI device is also effective in the case where it takes days until a fruit or vegetable is reached from a producing area to a store, for example. Moreover, there is a possibility that a best-before date can be calculated using the AI device.

The circuit 23 can include a circuit 24 having a function of selecting a column of the pixel array 81 (column driver), a circuit 25 for performing correlated double sampling processing on output data from the pixels 10 (CDS circuit), a circuit 26 having a function of converting analog data output from the circuit 25 into digital data (A/D converter circuit or the like), and the like.

A wiring having a function of supplying a signal from the circuit 28 (e.g., a wiring 121 and a wiring 122 to be described later) and a wiring having a function of supplying a signal to the circuit 23 (e.g., a wiring 124 to be described later) are electrically connected to the pixel 10 included in the pixel array 81.

Although FIG. 9 illustrates an example in which the pixel array 81 is used as the pixel array, the pixel array 83 and the pixel array 84 may be used as the pixel array. In this case, for example, the wiring having a function of supplying a signal from the circuit 28 is electrically connected to the pixel array 83, and the wiring having a function of supplying a signal to the circuit 23 is electrically connected to the pixel array 84, <Circuit Structure Example of Pixel>

Figure 10:
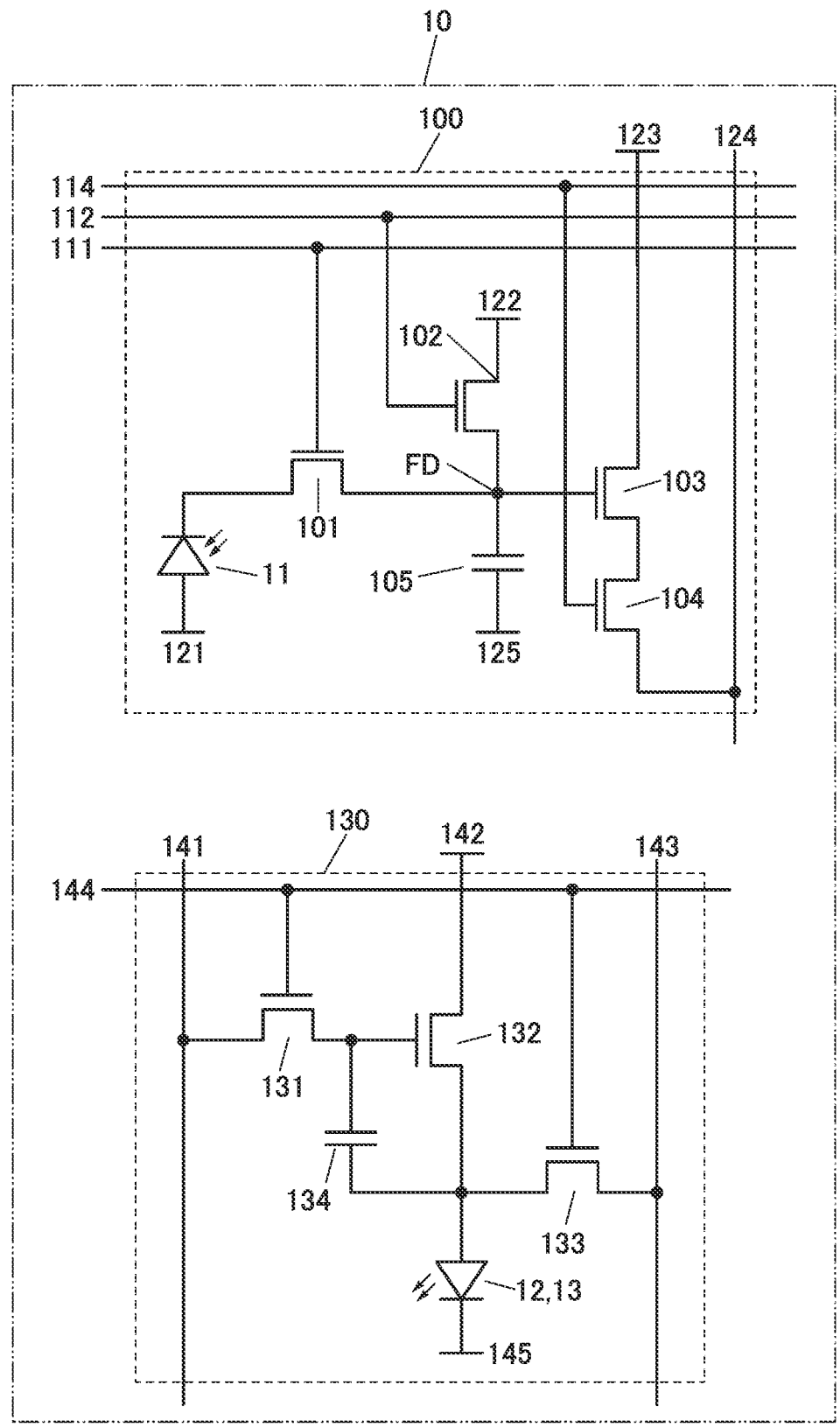
FIG. 10 is a diagram illustrating an example of a pixel.

FIG. 10 is a circuit diagram illustrating a structure example of the pixel 10. The pixel 10 includes an imaging circuit 100 provided with the photoelectric conversion element 11 and a display circuit 130 provided with the light-emitting element 12 or the light-emitting element 13. The imaging circuit is referred to as an imaging device in some cases. The display circuit is referred to as a display device in some cases.

<<Structure Example of Imaging Circuit>>

The imaging circuit 100 includes a transistor 101, a transistor 102, a transistor 103, a transistor 104, and a capacitor 105 in addition to the photoelectric conversion element 11, Note that a structure in which the capacitor 105 is not provided may be employed.

One electrode of the photoelectric conversion element 11 is electrically connected to one of a source and a drain of the transistor 101. The other of the source and the drain of the transistor 101 is electrically connected to one of a source and a drain of the transistor 102. The one of the source and the drain of the transistor 102 is electrically connected to a gate of the transistor 103. The gate of the transistor 103 is electrically connected to one electrode of the capacitor 105. One of a source and a drain of the transistor 103 is electrically connected to one of a source and a drain of the transistor 104.

Here, a node where the other of the source and the drain of the transistor 101, the one of the source and the drain of the transistor 102, the gate of the transistor 103, and the one electrode of the capacitor 105 are electrically connected is a node FD. The node FD can function as a charge accumulation portion.

A gate of the transistor 101 is electrically connected to a wiring 111. A gate of the transistor 102 is electrically connected to a wiring 112. A gate of the transistor 104 is electrically connected to a wiring 114. The other electrode of the photoelectric conversion element 11 is electrically connected to the wiring 121. The other of the source and the drain of the transistor 102 is electrically connected to the wiring 122. The other of the source and the drain of the transistor 104 is electrically connected to the wiring 124. The other electrode of the capacitor 105 is electrically connected to a wiring 125.

The wiring 111, the wiring 112, and the wiring 114 have a function of a scan line, and the conduction of each transistor can be controlled by a signal supplied to the gate of each transistor through the wiring 111, the wiring 112, and the wiring 114. The wiring 124 has a function of a data line, and imaging data obtained by the photoelectric conversion element 11 is output to the outside of the imaging circuit 100 through the wiring 124.

The wiring 121, the wiring 122, and the wiring 125 have a function of a power supply line. In the imaging circuit 100 illustrated in FIG. 10, a cathode of the photoelectric conversion element 11 is electrically connected to the one of the source and the drain of the transistor 101, and an anode of the photoelectric conversion element 11 is electrically connected to the wiring 121. Accordingly, the potential of the wiring 121 is set to a low potential and the potential of the wiring 122 is set to a high potential, whereby the potential of the node FD can be reset to a high potential for operation, so that the photoelectric conversion element 11 can be operated with a reverse bias. Note that the potential of the wiring 125 can be set to a low potential.

In this specification and the like, a high potential refers to a potential higher than a low potential. For example, the high potential can be a positive potential, and the low potential can be a ground potential or a negative potential.

The transistor 101 has a function of a transfer transistor. When the transistor 101 is brought into a conduction state, the potential of the node FD can be set to a potential corresponding to the amount of light exposure of the photoelectric conversion element 11. Thus, the imaging circuit 100 can obtain imaging data.

The transistor 102 has a function of a reset transistor. When the transistor 102 is brought into a conduction state, the potential of the node FD can be reset to a potential of the wiring 122.

The transistor 103 has a function of an amplifier transistor and can perform output corresponding to the potential of the node FD.

The transistor 104 has a function of a selection transistor. When the transistor 104 is brought into a conduction state, imaging data can be output to the wiring 124. Specifically, the current of the wiring 124 can have a value corresponding to imaging data.

<<Structure Example of Display Circuit>>

The display circuit 130 includes a transistor 131, a transistor 132, a transistor 133, and a capacitor 134 in addition to the light-emitting element 12 or the light-emitting element 13.

One of a source and a drain of the transistor 131 is electrically connected to a gate of the transistor 132. The gate of the transistor 132 is electrically connected to one electrode of the capacitor 134. One of a source and a drain of the transistor 132 is electrically connected to one of a source and a drain of the transistor 133. The one of the source and the drain of the transistor 133 is electrically connected to the other electrode of the capacitor 134. The other electrode of the capacitor 134 is electrically connected to one electrode of the light-emitting element 12 or the light-emitting element 13.

The other of the source and the drain of the transistor 131 is electrically connected to a wiring 41. The other of the source and the drain of the transistor 132 is electrically connected to a wiring 142. The other of the source and the drain of the transistor 133 is electrically connected to a wiring 143. A gate of the transistor 131 and a gate of the transistor 133 are electrically connected to a wiring 144. The other electrode of the light-emitting element 12 or the light-emitting element 13 is electrically connected to a wiring 145.

The wiring 141 has a function of a data line, and data including information on emission luminance of the light-emitting element 12 or the light-emitting element 13 is supplied to the display circuit 130 through the wiring 141. The wiring 143 has a function of a monitor line, and the electrical characteristics of the light-emitting element 12 or the light-emitting element 13, and the like can be detected by detection of current flowing through the wiring 143, for example. The wiring 144 has a function of a scan line, and the conduction of the transistor 131 and the transistor 133 can be controlled by a signal supplied to gates of the transistor 131 and the transistor 133 through the wiring 144.

The wiring 142 and the wiring 145 have a function of a power supply line. In the display circuit 130 illustrated in FIG. 10, an anode of the light-emitting element 12 or the light-emitting element 13 is electrically connected to the one of the source and the drain of the transistor 132, and a cathode of the light-emitting element 12 or the light-emitting element 13 is electrically connected to the wiring 145. Thus, when the potential of the wiring 142 is set to a high potential, and the potential of the wiring 145 is set to a low potential, the light-emitting element 12 or the light-emitting element 13 can be operated with a forward bias, so that current with the amount corresponding to data supplied to the display circuit 130 can flow through the light-emitting element 12 or the light-emitting element 13. Thus, the light-emitting element 12 or the light-emitting element 13 can emit light with luminance corresponding to the data supplied to the display circuit 130.

When the transistor 131 is brought into a conduction state in the display circuit 130 having the structure illustrated in FIG. 10, the potential of the gate of the transistor 132 can be set to a potential corresponding to data supplied from the wiring 141. Thus, data can be written to the display circuit 130.

The transistor 132 has a function of a driving transistor, and current flowing through the light-emitting element 12 or the light-emitting element 13 can be controlled in accordance with a potential supplied to the transistor.

Moreover, when the transistor 133 is brought into a conduction state, current can flow through the wiring 143. Thus, the electrical characteristics and the like of the light-emitting element 12 or the light-emitting element 13 can be obtained.

In FIG. 10, a structure in which the imaging circuit 100 and the display circuit 130 are not electrically connected to each other is employed. Thus, the imaging circuit 100 and the display circuit 130 can be controlled independently. Note that in the case where the imaging circuit 100 and the display circuit 130 are electrically connected to each other, the operation of the imaging circuit 100 and the operation of the display circuit 130 can be controlled depending on each other.

As the photoelectric conversion element 11, a photodiode can be used. In one embodiment of the present invention, imaging using infrared light is performed. Accordingly, a photodiode that can photoelectrically convert light in an infrared region is used as the photoelectric conversion element 11. For example, a pro junction photodiode using single crystal silicon for a photoelectric conversion portion, a pin photodiode using polycrystalline silicon or microcrystalline silicon for a photoelectric conversion layer, or the like can be used. Alternatively, a material that can photoelectrically convert light in an infrared region, such as a compound semiconductor, may be used.

The transistor 101 has a function of controlling the potential of the node FD. The transistor 102 has a function of resetting the potential of the node FD. The transistor 103 functions as a source follower circuit, and can output the potential of the node FD as image data to the wiring 124. The transistor 104 has a function of selecting a pixel from which the image data is output.

A transistor using a metal oxide in a channel formation region (hereinafter, an OS transistor) is preferably used as each of the transistor 101 and the transistor 102. The OS transistor has a feature of extremely low off-state current. When OS transistors are used as the transistor 101 and the transistor 102, a period during which charge can be retained at the node FD can be elongated greatly. Therefore, a global shutter system in which charge accumulation operation is performed in all the pixels at the same time can be used without complicating the circuit structure and operation method.

Figures 11A, 11B, 11C:
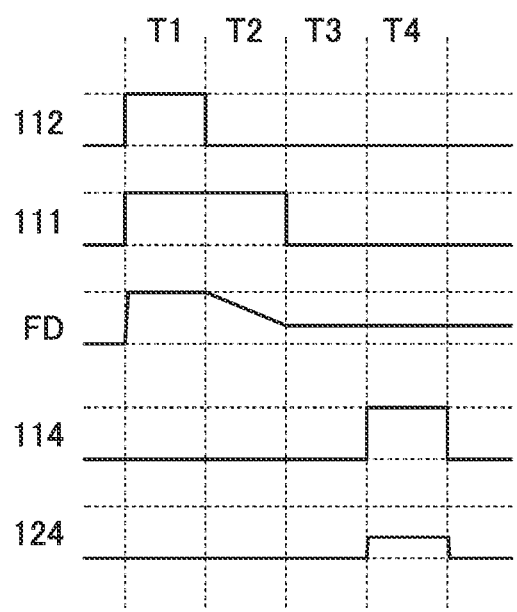
FIG. 11A, FIG. 11B, and FIG. 11C are timing charts showing examples of operation of an inspection device.

FIG. 11A is a schematic view of the operation method with a rolling shutter system, and FIG. 11B is a schematic view of a global shutter system. Note that En denotes exposure (accumulation operation) in the n-th column (n is a natural number), and Rn denotes reading operation in the n-th column, FIG. 11A and FIG. 11B show operation from the first row to the M-th row (M is a natural number). In FIG. 11A and FIG. 11B, the first row, the second row, and the third row are sequentially denoted by Line[1], Line[2], and Line[3], respectively, and the M-th row is denoted by Line[M].

The rolling shutter system is an operation method in which the exposure and data reading are performed sequentially and a reading period of a row overlaps with an exposure period of another row. The reading operation is performed right after the exposure, so that imaging can be performed even with a circuit structure having a relatively short data holding period. However, an image of one frame is composed of data that does not have simultaneity of imaging; therefore, distortion is caused in an image when imaging of a moving object is performed.

On the other hand, the global shutter system is an operation method in which exposure is performed on all the pixels simultaneously, data is held in each pixel, and data reading is performed row by row. Thus, an image without distortion can be obtained even when imaging of a moving object is performed.

In the case where a transistor with relatively high off-state current, such as a transistor using Si for a channel formation region (hereinafter, an Si transistor), is used in a pixel, a data potential is likely to flow out from the charge accumulation portion, and thus the rolling shutter system is used. In order to achieve the global shutter system using an Si transistor, a memory circuit or the like needs to be provided additionally, and more complex operation has to be performed at high speed. In contrast, in the case where an OS transistor is used in a pixel, a data potential hardly flows out from the charge accumulation portion, and thus the global shutter system can be achieved easily.

Note that OS transistors may also be used as the transistor 103 and the transistor 104. Note that an OS transistor and an Si transistor may be freely used in combination. Furthermore, all the transistors may be either OS transistors or Si transistors. Examples of the Si transistor include a transistor containing amorphous silicon and a transistor containing crystalline silicon (typically, low-temperature polysilicon, single crystal silicon, or the like).

An EL element can be used as each of the light-emitting element 12 and the light-emitting element 13. As the EL element, an element that emits infrared light or visible light can be used. It is particularly preferable that the element that emits infrared light be an EL element that emits near-infrared light having a peak in a wavelength of greater than or equal to 700 nm and less than or equal to 2500 nm. For example, light having a wavelength of 760 nm and its vicinity is likely to be absorbed by hemoglobin in a vein, so that the position of the vein can be detected by making an image from received reflected light from a palm, a finger, or the like. This action can be utilized for biometric identification. In addition, it can be used for a nondestructive inspection such as inspection of a foreign matter in food or failure analysis of an industrial product by using near-infrared light having an appropriate wavelength. Furthermore, when combined with the global shutter system, highly accurate sensing becomes possible even while an object is moving.

When an EL element is used as each of the light-emitting element 12 and the light-emitting element 13, an imaging device with a thin light source can be achieved and mounted on a variety of devices easily, leading to an improvement in portability.

Next, an example of the operation of the pixel 10 illustrated in FIG. 10 is described with reference to a timing chart in FIG. 11C. Note that in the description of the timing chart in this specification, a high potential is denoted by "H" and a low potential is denoted by "L". The wiring 121 is always supplied with "L", and the wiring 123 is always supplied with "H".

Note that the light-emitting element 12 or the light-emitting element 13 is supplied with a power supply potential for appropriate light emission at least during a period of accumulation operation.

In Period T1, the potential of the wiring 112 is set to "H", the potential of the wiring 111 is set to "H", and the potential of the wiring 114 is set to "L", whereby the transistor 101 and the transistor 102 are brought into conduction and the node FD is supplied with the potential "H" of the wiring 122 (reset operation).

In Period T2, the potential of the wiring 112 is set to "L", the potential of the wiring 111 is set to "H", and the potential of the wiring 114 is set to "L", whereby the transistor 102 is brought into non-conduction, and supply of a reset potential is stopped. Furthermore, the potential of the node FD is decreased in accordance with the operation of the photoelectric conversion element 11 (accumulation operation).

In Period T3, the potential of the wiring 112 is set to "L", the potential of the wiring 111 is set to "L", and the potential of the wiring 114 is set to "L", whereby the transistor 101 is brought into non-conduction, and the potential of the node FD is fixed and held (holding operation). At this time, using an OS transistor with low off-state current as each of the transistor 101 and the transistor 102 connected to the node FD can inhibit charge from unnecessarily flowing out from the node FD, so that data holding time can be made longer.

In Period T4, the potential of the wiring 112 is set to "L", the potential of the wiring 111 is set to "L", and the potential of the wiring 114 is set to "H", whereby the transistor 104 is brought into conduction, and thus the potential of the node FD is read to the wiring 124 by source follower operation of the transistor 103 (reading operation).

The above is an example of the operation of the pixel 10 illustrated in FIG. 10.

<Operation Example of Inspection Device>

Figure 12:
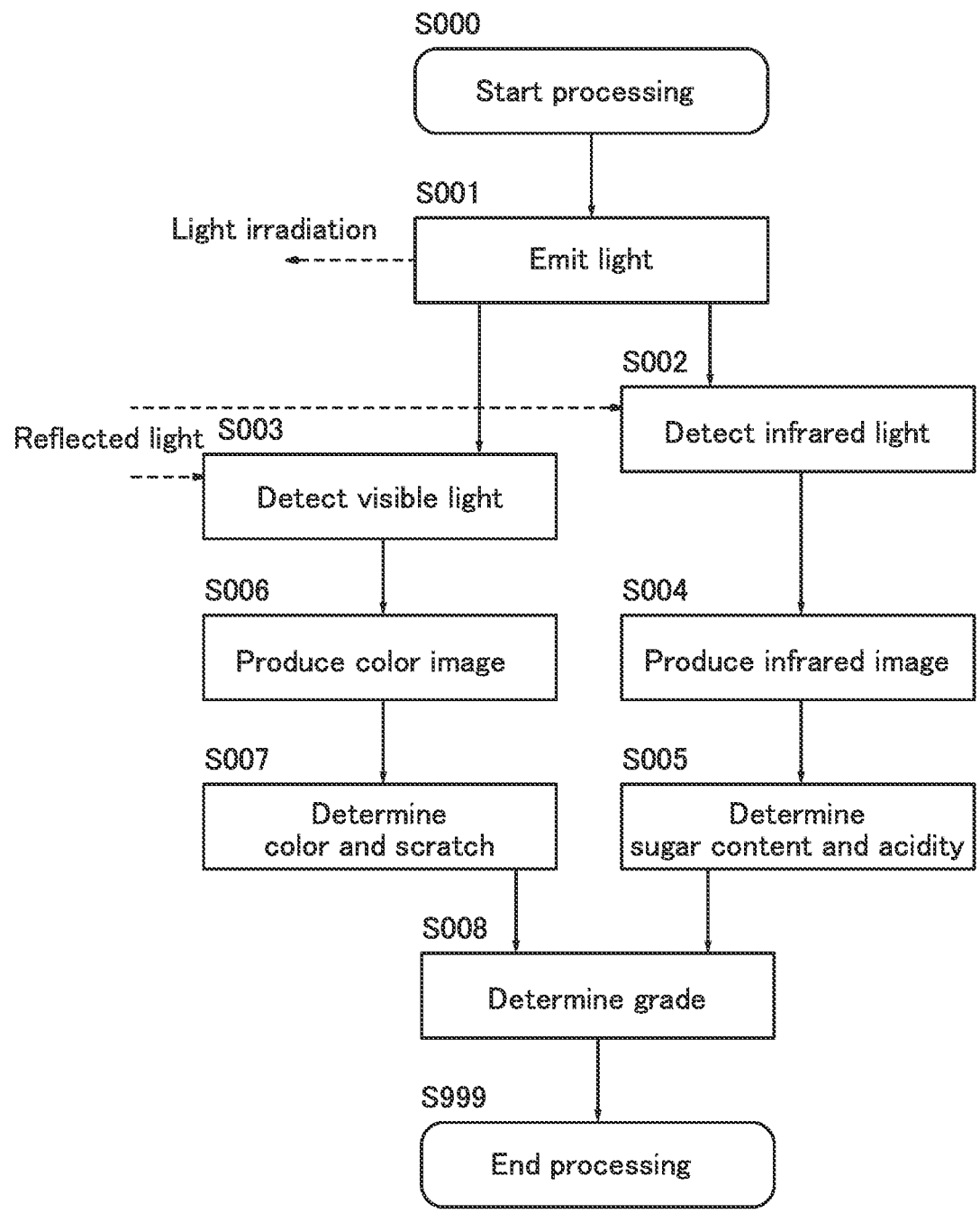
FIG. 12 is a flow chart showing an example of operation of an inspection device.

FIG. 12 is a flow chart showing an operation example of the inspection device 80.

Processing starts Step S000.

Next, in Step S001, the light-emitting element included in the pixel array 81 emits light. The fruit or vegetable 90 is irradiated with the emitted light. Here, for example, from the pixel array 81, infrared light is emitted, and then, visible light is emitted. Alternatively, infrared light and visible light is emitted simultaneously in some cases.

Light with which the fruit or vegetable 90 is irradiated is reflected and enters the photoelectric conversion element included in the pixel array 81. In Step S002, infrared light in reflected light is detected. In Step S003, visible light in the reflected light is detected.

Next, in Step S004, an infrared image is produced using the detected infrared light.

Then, in Step S005, the sugar content and the acidity of the fruit or vegetable 90 are determined on the basis of the produced infrared image.

Next, in Step S006, a color image is produced using the detected visible light. Alternatively, a gray image may be produced.

On the basis of the color image obtained in Step S006, determination of a class can be performed in Step S007 or Step S008. Alternatively; after Step S006, an image for determining a class may be produced additionally.

Next, in Step S007, the color and a scratch of the fruit or vegetable 90 are determined on the basis of the produced color image. Note that Step S007 may be performed at the same time as Step S005. For example, Step S006 may be performed before Step S005.

Then, in Step S008, the determination result obtained in Step S005 and the determination result obtained in Step S007 are combined, and grade determination is performed.

The processing ends in Step S999.

This embodiment can be combined with any of the other embodiments as appropriate.

Embodiment 2

In this embodiment, the pixel and the like included in the pixel array that can be used for the inspection device of one embodiment of the present invention are described.

<Structure Example of Pixel>

Figure 13A:
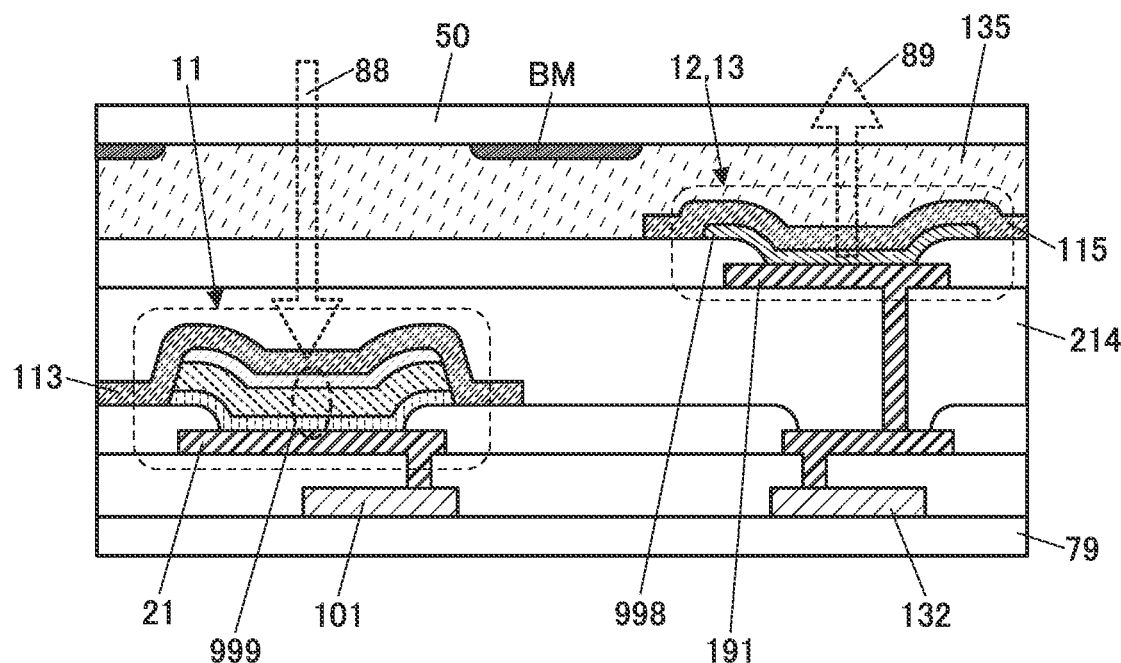
FIG. 13A and FIG. 13B are cross-sectional views illustrating examples of a pixel.

FIG. 13A illustrates an example of a cross-sectional view of the pixel 10. The pixel 10 includes the transistor 101, the transistor 132, the photoelectric conversion element 11, and the light-emitting element 12 or the light-emitting element 13, between the substrate 79 and a substrate 50. Here, for example, a transistor using a metal oxide in a channel formation region (hereinafter, OS transistor) can be used as each of the transistor 101 and the transistor 132.

A conductive layer 21 is electrically connected to one of the source and the drain of the transistor 101.

A substrate having flexibility is preferably used as the substrate 79. Examples of a material that can be used for a substrate having flexibility include plastics typified by polyethylene terephthalate (PET), polyethylene naphthalate (PEN), polyether sulfone (PES), and polytetrafluoroethylene (PTFE). Another example is a synthetic resin such as acrylic. Other examples are polypropylene, polyester, polyvinyl fluoride, and polyvinyl chloride. Other examples are polyimide, polyimide, aramid, epoxy, and an inorganic vapor deposition film. Alternatively, a board including metal, stainless steel, or stainless steel foil, a board including tungsten or tungsten foil, paper, a semiconductor (e.g., single crystal or silicon), or the like may be used.

The photoelectric conversion element 11 can be a pn-junction photodiode or a pin-junction photodiode, for example. The photoelectric conversion element 11 illustrated in FIG. 13A includes a semiconductor layer 999 formed over the conductive layer 21 and a conductive layer 113 over the semiconductor layer 999. The conductive layer 113 preferably has a light-transmitting property.

Alternatively, a conversion element including selenium may be used as the photoelectric conversion element 11.

An insulating layer 214 is provided over the conductive layer 113, and the light-emitting element 12 or the light-emitting element 13 is provided over the insulating layer 214.

The light-emitting element 12 or the light-emitting element 13 includes a conductive layer 191, a light-emitting layer 998, and a conductive layer 115. The conductive layer 191 is electrically connected to one of the source and the drain of the transistor 132. An EL layer can be used as the light-emitting layer 998. That is, each of the light-emitting element 12 and the light-emitting element 13 can be an EL (Electro-Luminescence) element. The conductive layer 115 preferably has a light-transmitting property.

An insulating layer 135 is provided over the conductive layer 115, and the substrate 50 is provided over the insulating layer 135. A black matrix BM may be included between the substrate 50 and the insulating layer 135.

Light 89 is emitted from the light-emitting element 12 and the light-emitting element 13. The fruit or vegetable 90 is irradiated with the light 89, and light 88 reflected by the fruit or vegetable 90 enters the photoelectric conversion element 11.

Figure 13B:
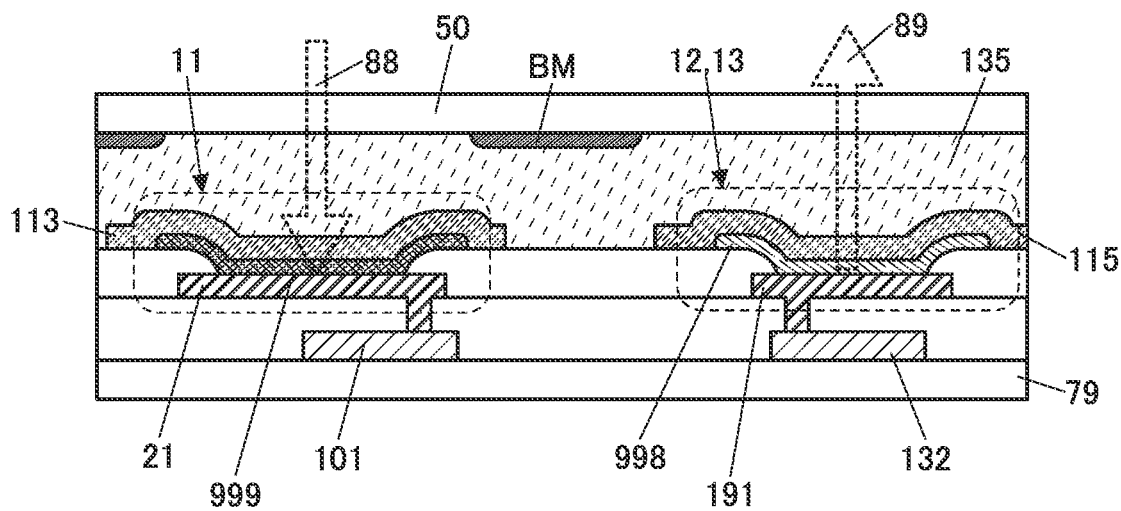

As illustrated in FIG. 13B, the photoelectric conversion element 11 and the light-emitting elements 12 and 13 may be formed in the same layer. In that case, the conductive layer 113 and the conductive layer 115 can be formed in the same step.

<Structure Example of Transistor>

Figure 14A:
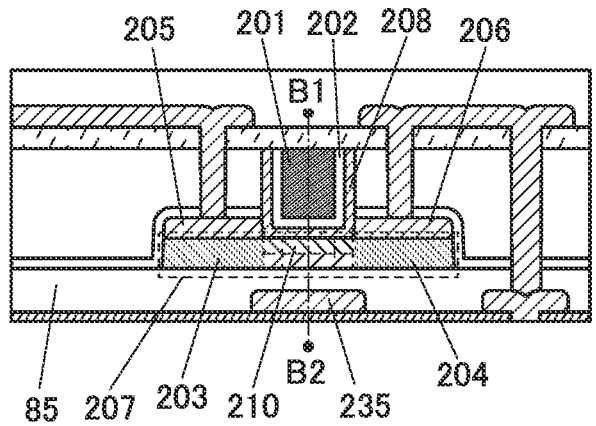
FIG. 14A, FIG. 14B, FIG. 14C, and FIG. 14D are cross-sectional views illustrating examples of a transistor.

FIG. 14A illustrates a detailed structure example of an OS transistor that can be used as the transistor 101 and the like. The OS transistor illustrated in FIG. 14A has a self-aligned structure in which an insulating layer is provided over a stacked layer of a metal oxide layer and a conductive layer and a groove reaching the metal oxide layer is provided in the insulating layer and the conductive layer so that a source electrode 205 and a drain electrode 206 are formed.

The OS transistor can include a gate electrode 201, a gate insulating layer 202, and a back gate electrode 235 in addition to a channel formation region 210, a source region 203, and a drain region 204 that are formed in a metal oxide layer 207. Here, at least the gate insulating layer 202 and the gate electrode 201 are provided in the groove. Furthermore, a metal oxide layer 208 may be provided in the groove. An insulating layer 85 has a function of a gate insulating layer for the back gate electrode 235.

Figure 14B:
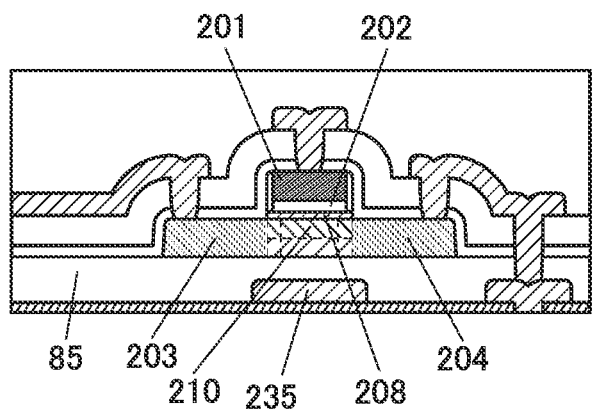

As illustrated in FIG. 14B, the OS transistor may have a self-aligned structure in which the source region 203 and the drain region 204 are formed in the metal oxide layer with the gate electrode 201 as a mask.

Figure 14C:
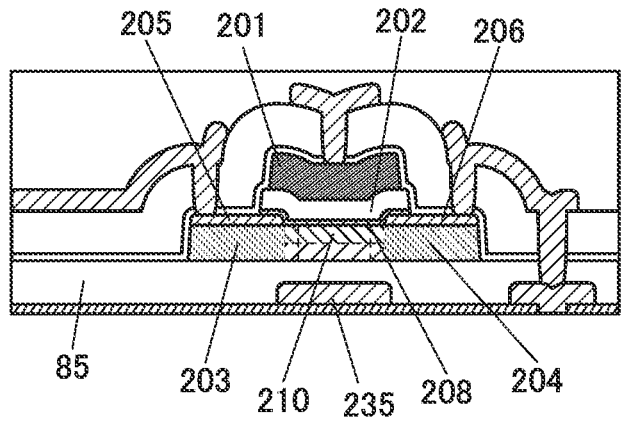

Alternatively, as illustrated in FIG. 14C, the OS transistor may be a non-self-aligned top-gate transistor including a region where the source electrode 205 or the drain electrode 206 and the gate electrode 201 overlap with each other.

Figure 14D:
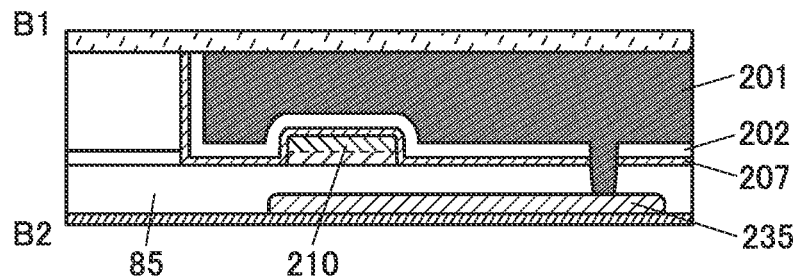

As illustrated in the cross-sectional view of the transistor in the channel width direction illustrated in FIG. 14D, the back gate electrode 235 may be electrically connected to the gate electrode 201 that is provided to face the back gate electrode 235 and is a front gate of the transistor. Note that FIG. 14D illustrates the transistor in FIG. 14A as an example; however, the same applies to a transistor having any of the other structures. Alternatively, a structure in which a fixed potential different from that for the front gate can be supplied to the back gate electrode 235 may be employed.

For example, as the metal oxide layer 207, a metal oxide such as an In-M-Zn oxide (an element M is one or more kinds selected from aluminum, gallium, yttrium, copper, vanadium, beryllium, boron, titanium, iron, nickel, germanium, zirconium, molybdenum, lanthanum, cerium, neodymium, hafnium, tantalum, tungsten, magnesium, and the like) is preferably used. An In—Ga oxide or an In—Zn oxide may be used for the oxide 207.

Furthermore, a metal oxide with a low carrier concentration is preferably used as the metal oxide layer 207, for example. In order to reduce the carrier concentration of the metal oxide, the concentration of impurities in the metal oxide is reduced so that the density of defect states can be reduced. In this specification and the like, a state with a low impurity concentration and a low density of defect states is referred to as a highly purified intrinsic or substantially highly purified intrinsic state. As examples of the impurities in the metal oxide, hydrogen, nitrogen, alkali metal, alkaline earth metal, iron, nickel, silicon, and the like are given.

In particular, hydrogen contained in a metal oxide reacts with oxygen bonded to a metal atom to be water, and thus forms oxygen vacancies in the metal oxide in some cases. If the channel formation region in the metal oxide includes oxygen vacancies, the transistor sometimes has normally-on characteristics. In some cases, a defect that is an oxygen vacancy into which hydrogen enters functions as a donor and generates an electron serving as a carrier, in other cases, bonding of part of hydrogen to oxygen bonded to a metal atom generates electrons serving as carriers. Thus, a transistor using a metal oxide containing much hydrogen is likely to have normally-on characteristics.

A defect in which hydrogen has entered an oxygen vacancy can function as a donor of the metal oxide. However, it is difficult to evaluate the defects quantitatively. Thus, the metal oxide is evaluated by carrier concentration, not by donor concentration, in some cases. Therefore, in this specification and the like, the carrier concentration assuming the state where an electric field is not applied is sometimes used, instead of the donor concentration, as the parameter of the metal oxide. That is, "carrier concentration" in this specification and the like can be replaced with "donor concentration" in some cases.

Therefore, hydrogen in the metal oxide layer 207 is preferably reduced as much as possible. Specifically, the hydrogen concentration of the metal oxide, which is measured by secondary ion mass spectrometry (SIMS), is lower than $1\times10^{20}$ atoms/cm$^3$, preferably lower than $1\times10^{19}$ atoms/cm$^3$, further preferably lower than $5\times10^{18}$ atoms/cm$^3$, still further preferably lower than $1\times10^{18}$ atoms/cm$^3$. When a metal oxide with a sufficiently low concentration of impurities such as hydrogen is used for a channel formation region of a transistor, the transistor can have stable electrical characteristics.

The carrier concentration of the metal oxide in the channel formation region is preferably lower than or equal to $1\times10^{18}$ cm$^{-3}$, further preferably lower than $1\times10^{17}$ cm$^{-3}$, still further preferably lower than $1\times10^{16}$ cm$^{-3}$, yet further preferably lower than $1\times10^{13}$ cm$^{-3}$, and yet still further preferably lower than $1\times10^{12}$ cm$^{-3}$. Note that the lower limit of the carrier concentration of the metal oxide in the channel formation region is not particularly limited and can be, for example, $1\times10^{-9}$ cm$^{-3}$.

In addition, when the source electrode 205 and the drain electrode 206 are in contact with the metal oxide layer 207, oxygen in the metal oxide layer 207 may be diffused into the electrodes, and the electrodes may be oxidized. It is highly possible that oxidation of the electrodes lowers the conductivity of the electrodes. Note that diffusion of oxygen in the metal oxide layer 207 into the electrodes can be rephrased as absorption of oxygen in the metal oxide layer 207 by the electrodes.

Moreover, when oxygen in the metal oxide layer 207 is diffused into the source electrode 205 and the drain electrode 206, another layer is formed between the metal oxide layer and each of the electrodes in some cases. The another layer contains more oxygen than the source electrode 205 and the drain electrode 206, and thus the another layer presumably has an insulating property. In this case, the three-layer structure of the source electrode 205 or the drain electrode 206, the another layer, and the metal oxide layer 207 can be regarded as a three-layer structure formed of metal-insulator-semiconductor, which is referred to as an MIS (Metal-Insulator-Semiconductor) structure or a diode junction structure having an MIS structure as its main part in some cases.

The metal oxide functioning as the channel formation region has a band gap of preferably 2 eV or higher, further preferably 2.5 eV or higher. With the use of a metal oxide having such a wide bandgap, the off-state current of the transistor can be reduced.

This embodiment can be combined with any of the other embodiments as appropriate.

Embodiment 3

In this embodiment, the concept of a market where the semiconductor device of one embodiment of the present invention can be used is described.

<Concept of Market>

Figure 15:
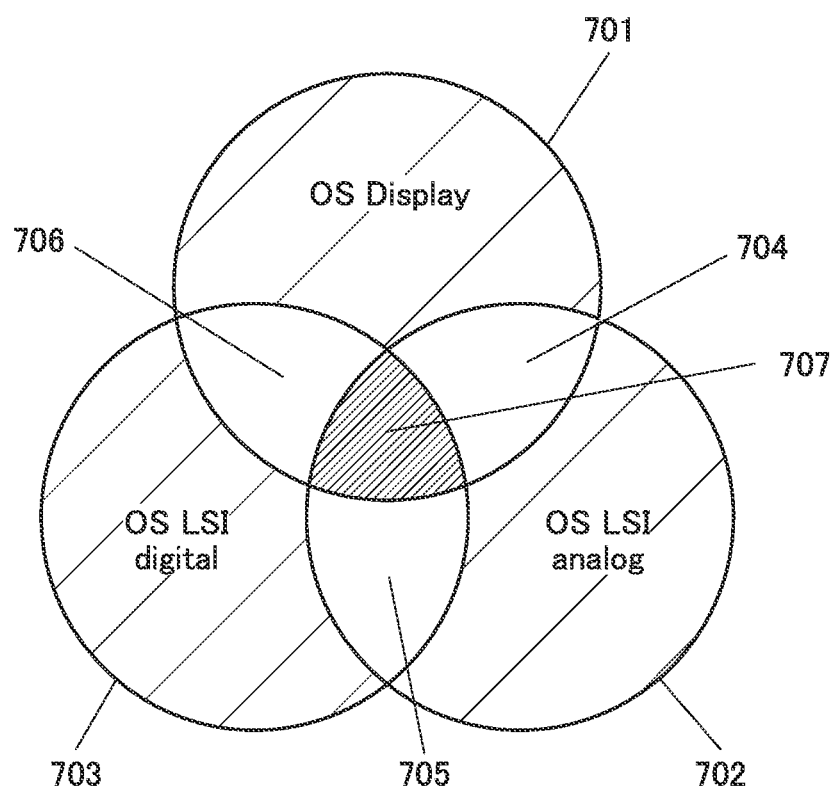
FIG. 15 is a diagram showing the concept of a market.

First, FIG. 15 illustrates the concept of the market where the semiconductor device of one embodiment of the present invention can be used. In FIG. 15, a region 701 represents a region (OS Display) of a product applicable to a display using a transistor including an oxide semiconductor in a channel formation region, a region 702 represents a product region (OS LSI analog) where an LSI (Large Scale Integration) using a transistor including an oxide semiconductor in a channel formation region can be applied in an analog manner, and a region 703 represents a product region (OS LSI digital) where an LSI using a transistor including an oxide semiconductor in a channel formation region can be applied in a digital manner. The semiconductor device of one embodiment of the present invention can be favorably used in three regions of the region 701, the region 702, and the region 703 illustrated in FIG. 15, in other words, three large markets.

In FIG. 15, a region 704 represents a region where the region 701 and the region 702 overlap with each other; a region 705 represents a region where the region 702 and the region 703 overlap with each other; a region 706 represents a region where the region 701 and the region 703 overlap with each other; and a region 707 represents a region where the region 701, the region 702, and the region 703 overlap with each other.

In OS Display, for example, a structure of an FET such as a Bottom-Gate OS FET (BG OSFET) or a Top-Gate OS FET (TG OS FET) can be preferably used. Note that the Bottom-Gate OS FET includes a channel-etch FET and a channel-protective FET. The Top-Gate OS FET includes a TGSA (Top Gate Self-Aligned) FET.

In OS LSI analog and OS LSI digital, for example, a Gate-Last OS FET (GL OS FET) can be preferably used.

Each of the above transistors includes a Single-Gate transistor including one gate electrode, a Dual-Gate transistor including two gate electrodes, and a transistor including three or more gate electrodes. Among Dual-Gate transistors, it is particularly preferable to use an S-channel (surrounded channel) transistor.

In this specification and the like, the S-channel transistor refers to a transistor structure in which a channel formation region is electrically surrounded by the electric fields of a pair of gate electrodes.

As products included in OS Display (the region 701), products including an LCD (liquid crystal display), EL (Electro-Luminescence), and an LED (Light Emitting Diode) in display devices can be given. The combination of the above display device and Q-Dot (Quantum Dot) is also preferable.

Note that in this embodiment, EL includes organic EL and inorganic EL, In this embodiment, LED includes a micro LED, a mini LED, and a macro LED. Note that in this specification and the like, a light-emitting diode whose chip area is less than or equal to 10000 $\mu m^2$ may be referred to as a micro LED, a light-emitting diode whose chip area is greater than 10000 $\mu m^2$ and less than or equal to 1 $mm^2$ may be referred to as a mini LED, and a light-emitting diode whose chip area is greater than 1 $mm^2$ may be referred to as a macro LED.

As products included in OS LSI analog (the region 702), a sound-source identification device that deals with a range of a variety of frequencies (e.g., audible sound with a frequency of 20 Hz to 20 kHz, or ultrasonic wave with a frequency of 20 kHz or more), a device for controlling a battery (a battery control IC, a battery protection IC, or a battery management system), and the like can be given.

As products included in OS LSI digital (the region 703), a memory device, a CPU (Central Processing Unit) device, a GPU (Graphics Processing Unit) device, a FPGA (field-programmable gate array) device, a power device, a hybrid device in which an OS LSI and an Si LSI are stacked or mixed, a light-emitting device, and the like can be given.

As products included in the region 704, a display device including an infrared ray sensor or a near-infrared ray sensor in a display region, a signal processing device with a sensor including an OS FET, an embedded biosensor device, and the like can be given. As products included in the region 705, a processing circuit including an A/D (Analog to Digital) converter circuit and the like, an AI device including the processing circuit, and the like can be given. As products included in the region 706, a display device to Which a Pixel AI technique is applied, and the like can be given. Note that in this specification and the like, the Pixel AI technique refers to a technique of utilizing a memory foil led using an OS FET included in a pixel of a display, and the like is used.

As a product included in the region 707, a composite product in which all products included in the above region 701 to region 706 are combined can be given.

As described above, the semiconductor device of one embodiment of the present invention can be used in all the product regions as illustrated in FIG. 15. That is, the semiconductor device of one embodiment of the present invention can be applied to many markets.

This embodiment can be combined with any of the other embodiments as appropriate.

REFERENCE NUMERALS

10; pixel, 10a: pixel, 10b: pixel, 11: photoelectric conversion element, 12: light-emitting element, 13: light-emitting element, 21: conductive layer, 22: circuit, 23: circuit, 24: circuit, 25: circuit, 26: circuit, 28: circuit, 31: control circuit, 50: substrate, 79: substrate, 80: inspection device, 81: pixel array, 83: pixel array, 84: pixel array, 85: insulating layer, 86: conveyor belt, 88: light, 89: light, 90: fruit or vegetable, 96: portable terminal, 98; area, 99: area, 100: imaging circuit, 101: transistor, 102: transistor, 103: transistor, 104: transistor, 105: capacitor, 111: wiring, 112: wiring, 113: conductive layer, 114: wiring, 115: conductive layer, 121: wiring, 122: wiring, 123: wiring, 124: wiring, 125: wiring, 130: display circuit, 131: transistor, 132: transistor, 133: transistor, 134: capacitor, 135: insulating layer, 141: wiring, 142: wiring, 143: wiring, 144: wiring, 145: wiring, 191: conductive layer, 201: gate electrode, 202: gate insulating layer, 203: source region, 204: drain region, 205: source electrode, 206: drain electrode, 207: metal oxide layer, 208: metal oxide layer, 210: channel formation region, 214: insulating layer, 235: back gate electrode, 701: region, 702: region, 703: region, 704: region, 705: region, 706: region, 707: region, 998: light-emitting layer, 999: semiconductor layer

The invention claimed is:

1. An inspection device comprising:
    a substrate having flexibility;
    a first light-emitting element over the substrate, the first light-emitting element configured to emit infrared light;
    a second light-emitting element over the substrate, the second light-emitting element configured to emit visible light:
    an imaging portion over the substrate; and
    an inspection circuit electrically connected to the imaging portion,
    wherein the substrate has a shape along a side surface of a cylinder,
    wherein the first light-emitting element is configured to be arranged so that the imaging portion enables to capture an infrared image of an inspection object using light from the first light-emitting element,
    wherein the second light-emitting element is configured to be arranged so that the imaging portion enables to capture a visible image of an inspection object using light from the second light-emitting element, and
    wherein the inspection circuit is configured to perform inspection based on the infrared image and the visible image.

2. The inspection device according to claim 1, wherein the inspection object is a fruit or vegetable.

3. The inspection device according to claim 1,
    wherein the inspection object is a fruit or vegetable,
    wherein the inspection circuit is configured to determine one or more of a sugar content, an acidity and a physiological disorder of the fruit or vegetable from the infrared image, wherein the inspection circuit is configured:
to determine a grade of the fruit or vegetable by detecting one or more of a color and a scratch of a surface of the fruit or vegetable from the visible image and the determination of the one or more of the sugar content, the acidity and the physiological disorder; and
to determine a class of the fruit or vegetable by detecting a size of the fruit or vegetable from the visible image.

4. The inspection device according to claim 1, wherein the imaging portion comprises a photoelectric conversion element.

5. The inspection device according to claim 1, wherein a diameter of the cylinder is variable.

6. The inspection device according to claim 3, wherein the grade and the class are determined from different visible images.

7. The inspection device according to claim 1, wherein each of the first light-emitting element and the second light-emitting element is an organic electroluminescent element.

8. The inspection device according to claim 1,
wherein the first light-emitting element comprises a first plurality of light-emitting devices,
wherein the second light-emitting element comprises a second plurality of light-emitting devices,
wherein the imaging portion comprises a plurality of photoelectric conversion devices, and
wherein the first plurality of light-emitting devices, the second plurality of light-emitting devices and the plurality of photoelectric conversion devices are arranged alternately on the substrate.

9. The inspection device according to claim 1, wherein the inspection circuit is configured to perform an arithmetic operation using a neural network.

10. A method for operating an inspection device, comprising the steps of:
putting an inspection object on an inspection portion surrounded by a pixel array over a substrate,
performing irradiation with infrared light from a first light-emitting element on the inspection object;
capturing an infrared image of the inspection object by a photoelectric conversion element during the irradiation with the infrared light;
performing irradiation with visible light from a second light-emitting element on the inspection object;
capturing a visible image of the inspection object by the photoelectric conversion element during the irradiation with the visible light; and
making an inspection result from the infrared image and the visible image,
wherein the substrate has flexibility,
wherein the substrate has a shape along a side surface of a cylinder,
wherein the pixel array comprises a plurality of pixels, and
wherein the plurality of pixels comprises the first light-emitting element, the second light-emitting element and the photoelectric conversion element.

11. The method for operating an inspection device, according to claim 10,
wherein the first light-emitting element comprises a first plurality of light-emitting devices,
wherein the second light-emitting element comprises a second plurality of light-emitting devices,
wherein the photoelectric conversion element comprises a plurality of photoelectric conversion devices, and
wherein the first plurality of light-emitting devices, the second plurality of light-emitting devices and the plurality of photoelectric conversion devices are arranged alternately in the pixel array.

12. The method for operating an inspection device, according to claim 10, wherein the inspection object is a fruit or vegetable.

13. The method for operating an inspection device, according to claim 12, further comprising the steps of:
determining one or more of a sugar content, an acidity and a physiological disorder of the fruit or vegetable from the infrared image;
detecting a size of the fruit or vegetable from the visible image; and
detecting one or more of a color and a scratch of a surface of the fruit or vegetable from the visible image.

14. The method for operating an inspection device, according to claim 13, wherein the size and the one or more of the color and the scratch are detected from different visible images.

15. The method for operating an inspection device, according to claim 12, further comprising the steps of:
determining a grade of the fruit or vegetable; and
determining a class of the fruit or vegetable.

16. The method for operating an inspection device, according to claim 10, wherein a diameter of the cylinder is variable.

17. The method for operating an inspection device, according to claim 10, wherein each of the first light-emitting element and the second light-emitting element is an organic electroluminescent element.

18. The inspection device according to claim 1, wherein the substrate and the pixel array are included in a single component.

19. The method for operating an inspection device, according to claim 10, wherein the substrate and the pixel array are included in a single component.

* * * * *